United States Patent

Kurabayashi et al.

[11] Patent Number: 6,105,045
[45] Date of Patent: Aug. 15, 2000

[54] IMAGE PROCESSING APPARATUS AND IMAGE ATTRIBUTE ALTERING METHOD

[75] Inventors: Noriyuki Kurabayashi; Yoshiharu Hibi; Takahide Inoue; Tomoyasu Matsuzaki; Shinji Kita, all of Ebina, Japan

[73] Assignee: Fuji Xerox Co., Ltd., Tokyo, Japan

[21] Appl. No.: 08/732,989

[22] Filed: Oct. 16, 1996

[30] Foreign Application Priority Data

Oct. 18, 1995 [JP] Japan .................................. 7-270316
Sep. 18, 1996 [JP] Japan .................................. 8-246659

[51] Int. Cl.$^7$ .............................. G06F 17/30; G06T 3/20
[52] U.S. Cl. .......................................... 707/526; 707/529
[58] Field of Search .................................. 707/526, 528, 707/527, 515, 520, 517; 358/538, 500, 520; 345/431, 125, 326, 136, 113–118

[56] References Cited

U.S. PATENT DOCUMENTS 5,048,114  9/1991  Moriya .................................. 382/61
5,194,945  3/1993  Kadowski et al. ...................... 358/75

OTHER PUBLICATIONS

Kate O'day, Adobe Photoshop, Adobe Systems Incorporated, pp. 79–85, Jan. 1993.

*Primary Examiner*—Joseph H. Feild
*Assistant Examiner*—Alford W. Kindred
*Attorney, Agent, or Firm*—Oliff & Berridge, PLC

[57] ABSTRACT

Data for use in specifying an image to be registered and data indicative of processing contents to be executed are listed in list structure and registered in a "reference list to image storage unit" and a "reference list to processing-content storage unit," respectively. The aggregate area thus listed is subordinated to another aggregate area. When image processing and output are performed and produced, an aggregate area is designated and the processing contents are applied to the image registered in the aggregate area. Even a low-order aggregate area is processed in accordance with the listed contents of the high-order aggregate area.

25 Claims, 18 Drawing Sheets

FIG. 3 (a)
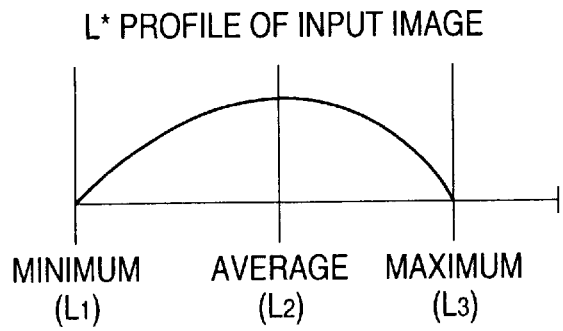
L* PROFILE OF INPUT IMAGE
MINIMUM (L1)  AVERAGE (L2)  MAXIMUM (L3)
FIG. 3 (b)
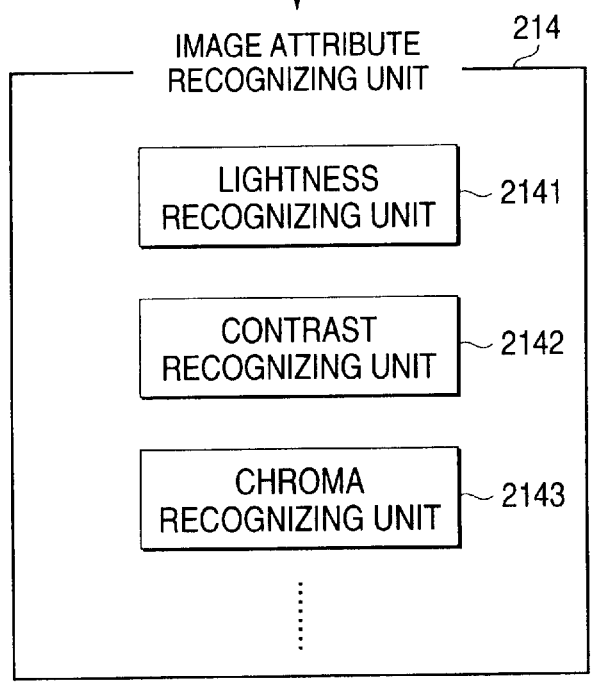
IMAGE ATTRIBUTE RECOGNIZING UNIT — 214
- LIGHTNESS RECOGNIZING UNIT — 2141
- CONTRAST RECOGNIZING UNIT — 2142
- CHROMA RECOGNIZING UNIT — 2143
FIG. 3 (c)
ATTRIBUTE RECOGNITION RESULT
| LIGHTNESS (L*: 0 ~ 255) | | | ...... |
|---|---|---|---|
| MINIMUM L1 | AVERAGE L2 | MAXIMUM L3 | |
| 0 | 160 | 200 | |

FIG. 4 (a)

| ATTRIBUTE TYPE (-20 ~ +20) | | | |
|---|---|---|---|
| LIGHTNESS | CONTRAST | CHROMA | ····· |
| +2 | +1 | 0 | |

FIG. 4 (b)

| DOCUMENT TYPE | ATTRIBUTE TYPE (-20 ~ +20) | | | |
| | LIGHTNESS | CONTRAST | CHROMA | ····· |
|---|---|---|---|---|
| STANDARD | +2 | +1 | 0 | |
| IMAGE | (STANDARD) | (STANDARD) | +1 | |
| PORTRAIT (IMAGE) | +1 | (IMAGE) | +2 | |
| ⋮ | | | | |

ATTRIBUTE RECOGNITION RESULT

| LIGHTNESS (L*: 0 ~ 255) | | | ..... |
|---|---|---|---|
| MINIMUM $L_1$ | AVERAGE $L_2$ | MAXIMUM $L_3$ | |
| 0 | 160 | 200 | |

CALCULATION RESULT

| | LIGHTNESS (L*: 0 ~ 255) | | | ..... |
|---|---|---|---|---|
| | MINIMUM $L_1'$ | AVERAGE $L_2'$ | MAXIMUM $L_3'$ | |
| LOWER LIMIT | 0 | 102 | 204 | |
| STANDARD | 0 | 128 | 255 | |
| UPPER LIMIT | 0 | 154 | 255 | |

CALCULATION RESULT

|  | LIGHTNESS (L*: 0 ~ 255) | | | ..... |
|---|---|---|---|---|
|  | $L_1'$ | $L_2'$ | $L_3'$ |  |
| LOWER LIMIT | 0 | 102 | 204 |  |
| STANDARD | 0 | 128 | 255 |  |
| UPPER LIMIT | 0 | 154 | 255 |  |

ADJUSTING QUANTITY DEFINITION "VIVID"

| ATTRIBUTE TYPE (-20 ~ +20) | | | ..... |
|---|---|---|---|
| LIGHTNESS | CONTRAST | CHROMA |  |
| +2 |  |  |  |

ADJUSTMENT LEVEL DETERMINATION

ADJUSTMENT RESULT

| LIGHTNESS (L*: 0 ~ 255) | | | ..... |
|---|---|---|---|
| MINIMUM $L_1''$ | AVERAGE $L_2''$ | MAXIMUM $L_3''$ |  |
| 0 | 131 | 255 |  |

IMAGE PROCESSING APPARATUS AND IMAGE ATTRIBUTE ALTERING METHOD

BACKGROUND OF THE INVENTION

1. Field of the Invention

The present invention relates to an image processing apparatus for performing image processing between a plurality of color image input units and a plurality of color image output units and more particularly to an image processing apparatus capable of processing, in an integrated manner, a color document comprising image elements fed from the plurality of color image input units, which image elements have different image attributes and to an image-attribute adjusting method.

2. Description of the Related Art

A document is generally formed of a plurality of image elements such as characters, diagrams and photographs, and the preparation and editing of these image elements are often made by executing a special application program corresponding to the kind of the element. When the image element is caused to undergo image processing, the application program used to prepare the element is normally employed for the image processing. Thus there is an environmental restriction in that the special application corresponding to the kind of the image element has to be relied upon in the process of preparing such a document.

When DTP is used to prepare a color document, proper printing is made after checking by design proof and color proof are carried out. In a case where correction or modification to the image element is required after the proper printing, that is, where satisfactory color reproduction is unobtainable, correction work will have to be done retroactively to the application used to prepare the image element due to the aforementioned environmental restriction even an editing process like color adjustment and a process without being accompanied by the preparation of a new image element, for example, are to be dealt with.

In this case, the image processing application is broadly classified into two categories: a pixel-to-pixel image data processing type and a descriptive type with the preparation of a row of processing contents with respect to image data. In other words, the first type is to cause image data to undergo direct processing; apart from the processing concerned, image data is saved in a buffer or the like before and each time the processing is performed and when the processing is canceled, the cancellation of such processing is fulfilled by restoring the image data thus saved.

In the second type, on the other hand, a thinning-out image (reduced image), not an original image, is caused to undergo processing in the course of editing, whereby not only response speed but also independence of processing contents is improved. Moreover, recovery is easy when the processing is canceled since the original image is not caused to undergo processing unless a special instruction is given in the course of editing.

In the aforementioned image processing application, the first type has the following problem: In the first type, the image processing time required becomes longer in proportion to image data capacity. In this case, a decrease in processing speed poses a serious problem particularly when an extremely large image is dealt with because data capacity grows larger with its dependence on image size, resolution, the number of colors and the like.

Moreover, neither of the above types are equipped with means of dealing with, in an integrated manner, a plurality of images prepared with different applications or means of pigeonholing and partially utilizing processing contents. This is because the processing contents have been defined as part of the image attributes and are manipulated by the applications.

Therefore, a linear flow is induced so that a layout is made after each image is completed and consequently the degree of freedom and flexibility of image processing are impaired, which constitutes a minus factor in document productivity.

SUMMARY OF THE INVENTION

An object of the present invention made in view of the foregoing situation is to provide an image processing apparatus adapted for increasing the degree of freedom and flexibility of image processing by making it possible to designate or alter processing contents with respect to image elements having different attributes, and an image-attribute adjusting method.

In order to accomplish the above object, according to a first aspect of the invention, there is provided an image processing apparatus comprising:

input means for entering a plurality of input image data for image formation which include image elements having different image attributes;

aggregate area defining means for defining aggregate areas which indicate image processing contents to be applied to the input image data;

image data group forming means for forming an image data group by allocating the input image data to the aggregate areas;

determining means for determining a particular one of image processing contents to be applied to the input image data; and designating means for designating the particular image processing content with respect to the aggregate areas.

With the above configuration, the individual designation and alteration of the processing contents are facilitated since the plurality of image data with image elements having different image attributes are kept separated from the contents of image processing to be applied, so that the degree of freedom and flexibility of the image processing can be expanded.

In this case, it is preferred for an object of image processing to have an attribute to be adjusted with respect to the image data and at the adjusting level of the attribute. Further, the editing and preparation of image elements can be dispensed with by making the image processing a color adjusting process, and the system is made easy to handle by employing a standard color space signal.

In the first invention, maintainability of the processing contents separated from the image data is improvable by having the contents of the decided image processing stored and making the contents of the stored image processing alterable. In this case, the alteration of the processing contents may be made by, for example, altering the processing order.

On the other hand, the addition of tag information indicating the contents of image processing makes it possible to obtain high-quality image output by letting another image processing apparatus and a special output unit interpret the image data supplied with tag information and actually perform the image processing, whereby the processing time in the present image processing apparatus can be planned to be shorten. In this case, the specific image processing can collectively be performed with respect to the image concerned by applying the image processing to the group of image data allocated to the aggregate area according to the decided image processing. On the other hand, in the case of processing image data itself to which tag information is not added, no special output unit is necessary, which provides a merit that the system can be built at a low cost.

According to a second aspect of the invention, there is provided an image processing apparatus comprising:

input means for entering a plurality of input image data for image formation which include image elements having different image attributes;

adjusting quantity defining means for defining, as an adjusting quantity, an image processing content to be applied to the input image data;

aggregate area defining means for defining aggregate areas to be used for designating image processing contents to be applied to image data, image data group forming means for forming an image data group by allocating the input image data to the aggregate areas;

attribute recognizing means for recognizing an attribute of the input image data and a level of the attribute;

designating means for designating the image processing content defined by the adjusting quantity defining means with respect to the aggregate areas; and adjusting means for adjusting the attribute level of image data allocated to an image-processing-content-designated aggregate area in accordance with the adjusting quantity.

With the above configuration, the adjustment of the attribute level based on the contents of the image processing defined can collectively be processed with respect to the group of image data allocated to the aggregate area, whereby it is possible to deal with the plurality of images in an integrated manner.

In this case, the adjusting quantity thus defined should preferably be defined with an ambiguous expression; for example, a sensuous expression, uses at the time of image output, images of image data are taken into consideration.

In the second aspect of the invention, the adjusting quantity thus defined may be converted into the attribute of image data and the adjusting level of the attribute based on which the attribute level of the image data may be adjusted, in which case the individual image entered can be properly processed.

Further, the contents of the image processing thus defined may be individually designated with respect to the image data entered and the attribute level of the image data may be adjusted accordingly, in which case the aggregate areas can be designated collectively and individually.

According to a third aspect of the invention, there is provided an image attribute adjusting method for adjusting an attribute of input image data in accordance with an instruction from a user, comprising the steps of:

defining an image processing content to be applied to given image data as an adjusting quantity, setting aggregate areas to be used for designating the adjusting quantity to be applied to image data;

allocating particular image data to one of the aggregate areas thus set in accordance with an instruction from the user;

designating the adjusting quantity with respect to the aggregate area to which the particular image data has been allocated; and processing the particular image data in the aggregate area in accordance with the adjusting quantity.

With this method, as in case of the second aspect of the invention, the adjustment of the attribute level based on the contents of the image processing defined can collectively be processed with respect to the group of image data allocated to the aggregate area, making it possible to deal with the plurality of images in an integrated manner.

BRIEF DESCRIPTION OF THE DRAWINGS

FIG. 3 includes a graph showing an attribute of an input image and the attribute level according to the embodiment of the invention (part (a)), a diagram illustrating an exemplary arrangement of an image recognizing unit according to the embodiment of the invention (part (b)), and a table showing the recognized results of the attribute (part (c));

FIGS. 4(a) and 4(b) are tables showing exemplary definitions of adjustments according to the embodiment of the invention;

DESCRIPTION OF THE PREFERRED EMBODIMENT

The preferred embodiment of the present invention will subsequently be described by reference to the accompanying drawings.

<1: System Configuration>

Figure 1:
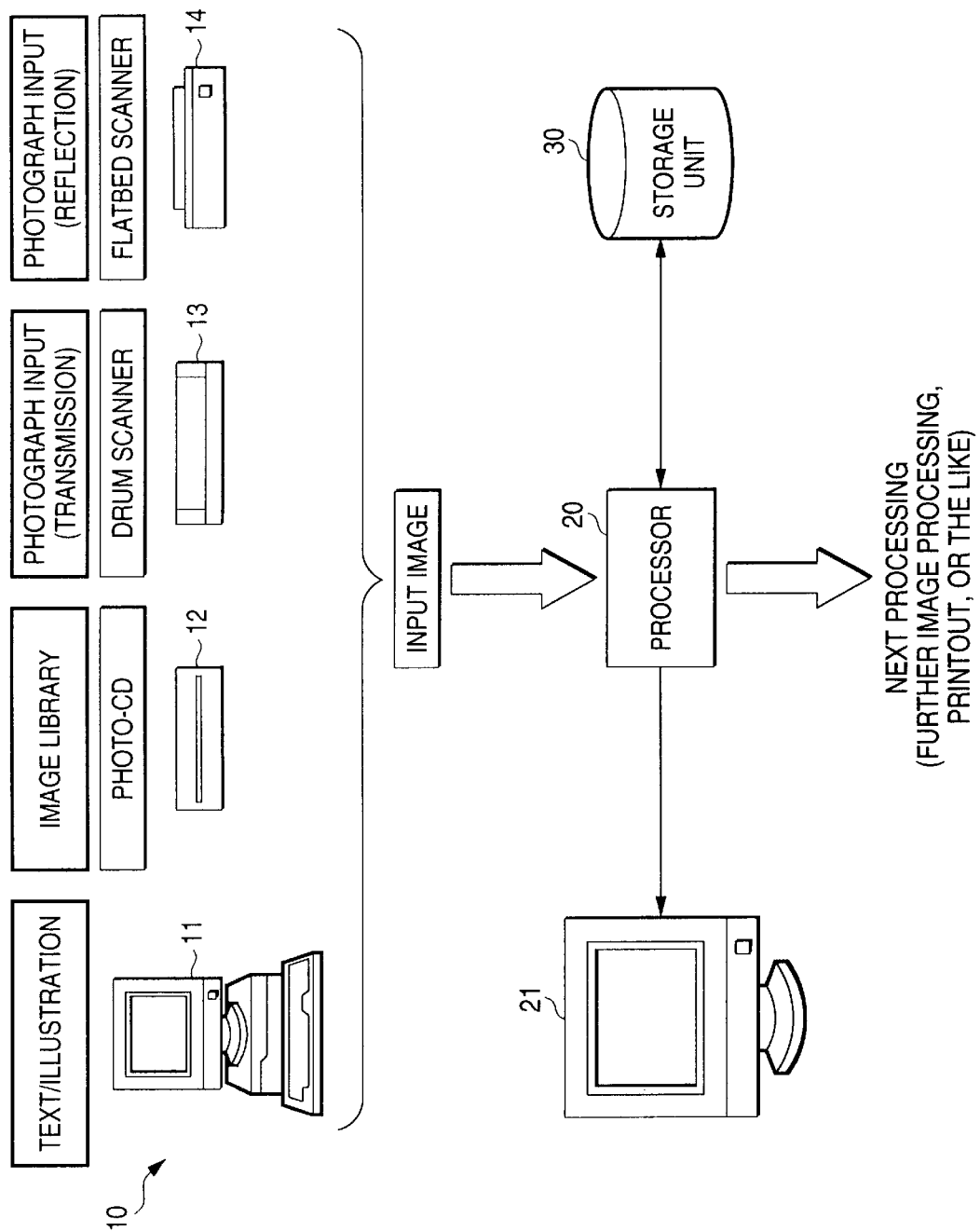
FIG. 1 is a block diagram illustrating an overall system configuration including an image processing apparatus embodying the present invention.

First, a description will be given of an overall system configuration including an image processing apparatus embodying the present invention by reference to FIG. 1. As shown in FIG. 1, image elements constituting a document are fed by various input units 10. For example, a text, an illustration, and the like are created by a personal computer 11 and entered as shown in FIG. 1. As for images such as a photograph, those which are read out of a photo-CD 12 and read by a drum scanner 13 and a flatbed scanner 14 are entered. The input is typically effected in a file form, and images are actually transferred via transportable storage media such as a floppy disk and various interfaces.

Therefore, the characteristics (attributes) of the image elements entered, more specifically, color characteristics, resolution, data file formats, formats and so forth, are dependent on the input units 10. Conversely, the image elements entered by different put units have attributes different from each other. Moreover, the image element entered includes data other than image data; for example, it may include data defining processing contents to be applied to the image element. In this case, the attribute includes the processing contents.

A processor 20, which will be described in detail later, provides a necessary operating environment by means of a UI (user interface) and causes an input image to undergo processing corresponding to the operation concerned. Accordingly, the processor 20 writes and reads necessary information, data and the like to and from a storage unit 30 during image processing and has reduced image elements displayed on a display unit 21 using various icons.

In the image data caused by the processor 20 to undergo image processing, a tag indicating the processing contents is buried in its data format, so that the image data is supplied as data to be input to another image processor or a special output unit and is output in a state in which image processing has actually been performed.

<1-1: Configuration of Processor>

Figure 2:
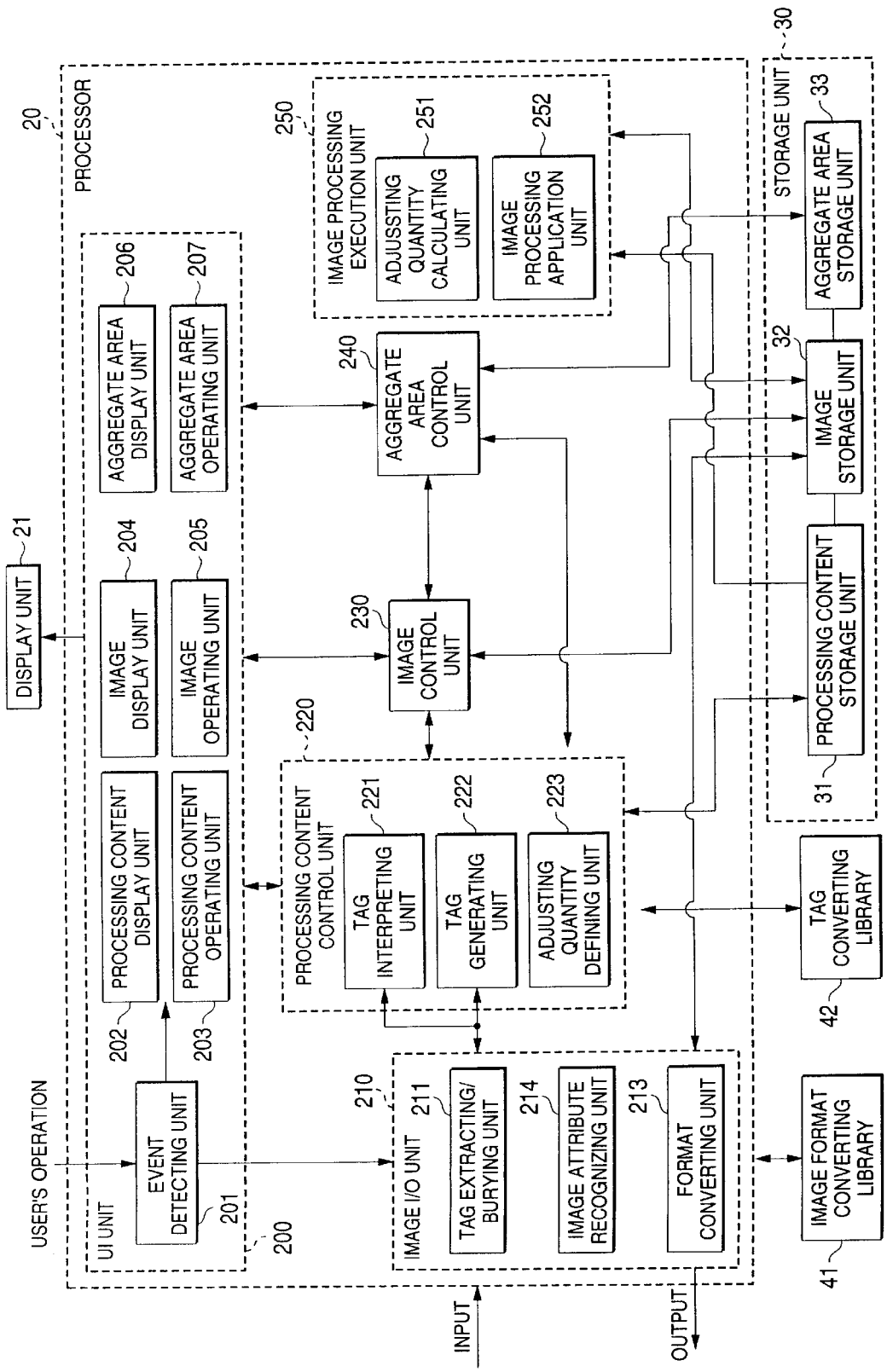
FIG. 2 is a block diagram illustrating an arrangement of the image processing apparatus according to the embodiment of the invention.

Referring to FIG. 2, there will be given a description of the construction of the processor 20 according to the present invention.

In FIG. 2, a UI unit 200 makes the display unit 21 display an image, an aggregate area, which will be described later, processing contents and the like in the form of icons, for example, so as to reflect them in user's input operations and to give instructions concerning a process corresponding to the input operation to each component unit. The UI unit 200 will subsequently be described.

The UI unit 200 comprises an event detecting unit 201 for detecting state (event) variation in the user's operation and informing each unit of the event thus detected; a processing-content display unit 202 for iconizing the processing contents and having them displayed on the display unit 21; a content operating unit 203 for manipulating the processing contents in response to the input operation; an image display unit 204 for typically reducing or iconizing an image in process so as to have the image displayed on the display unit 21; an image operating unit 205 for operating the image typically reduced or iconized before being displayed in response to the input operation; an aggregate area display unit 206 for iconizing the aggregate area and displaying the iconized aggregate area on the display unit 21; and an aggregate area operating unit 207 for operating the iconized aggregate area thus displayed in response to the input operation.

An image input-output unit 210 comprises a tag extracting/burying unit 211 for extracting the tag extracted from the image data that has been entered and burying the tag in image data to be output when an apparatus at the following stage is entrusted with actual image processing with respect to image data; a format converting unit 213 for converting the format if the image data thus input; and an image-attribute recognizing unit 214 for recognizing the attribute of the image data thus input. When the format is converted, an image format converting library 41 stored with the corresponding relation between the input format and what is subjected to conversion is referred to. Moreover, an image attribute to be recognized by the image-attribute recognizing unit 214 will be described later.

A processing-content control unit 220 comprises an interpretation unit 221 for converting a tag into processing contents; a tag generating unit 222 for conversely converting processing contents into a tag; and an adjusting-quantity defining unit 223 for defining the adjusting quantity of the attribute of an image as an object to be processed, the processing-content control unit being used to control a processing-content storage unit 31 further. A tag conversion library 42 which is stored with these corresponding relations is referred to when the conversion of the tag and the processing contents is made. Moreover, the contents defined by the adjusting-quantity defining unit 223 are stored in the processing content-storage unit 31, which contents will be described later.

An image control unit 230 specifies the image as an object to be processed and also controls an image storage unit 32. An aggregate area control unit 240 controls not only images and the like registered in the aggregate area but also an aggregate area storage unit 33.

Further, an image-processing execution unit 250 comprises an adjusting-quantity calculating unit 251 for calculating the attribute of an image as an object to be processed and its adjusting level; and an image-processing application unit 252 for causing an original image or a thinned image as an object to be processed to undergo image processing at the adjusting level calculated by the adjusting-quantity calculating unit 251. In this case, the original image means an image that has been entered but has not been subjected to processing.

<1-2: Results of Recognition of Image Attribute>

The attribute of the image recognized by the image-attribute recognizing unit 214 will subsequently be described by reference to FIG. 3. In this description, an example of an image attribute is assumed to be the lightness (L*) indicated by the CIE-LAB color space.

In this case, the image-attribute recognizing unit 214 statistically processes the lightness components of the image data thus entered to obtain a minimum value $L_1$, a mean value $L_2$ and a maximum value $L_3$. In a case where the lightness component of the image data thus entered is indicated by 8 bits (0–255) as shown in FIG. 3(a), the lightness obtained by a lightness recognizing unit 2141 constituting the image-attribute recognizing unit 214 results in minimum value $L_1=0$, mean value $L_2=160$ and maximum value $L_3=200$.

In a case where the image data thus entered is fetched by the drum scanner 13 and the flatbed scanner 14, the color space is generally RGB; even in this case, however, lightness is obtainable through color space conversion. Moreover, the image attribute is not limited to lightness but may be chroma or contrast and furthermore not only the CIE-LAB color space but also any other color space such as HLS may be used as a standard. When any attribute other than lightness is recognized, an arrangement for use in recognizing the attribute, for example, a contrast-recognizing unit 2142 is only needed to recognize contrast and so is a chroma recognizing unit 2143 to recognize chroma. In addition, a computing point of the attribute may needless to say be set at what is other than the minimum, mean and maximum values.

The attribute and attribute level of the image data resulting from recognizing the attribute thus obtained are stored in the image storage unit 32 through a process which will be described later.

<1-3: Adjusting-quantity Definition>

A description will subsequently be given of the adjusting-quantity definition carried out by the adjusting-quantity defining unit 223.

First, the adjusting-quantity definition means "ambiguously defining" the processing contents applied to image data as an object to be processed with sensuous expressions or words and phrases indicative of output uses, image contents and the like. By the sensuous expressions is meant that, for example, psychological expressions such as "vivid" and "warm," and sensory expressions such as "hard" and "transparent" fall under this category. Moreover, words and phrases concerning the output uses include "OHP," "presentation" and "educational," whereas those concerning images include "scenery," "person" and "mechanical object."

More specifically, the processing contents indicated by the adjusting-quantity definition are set so that they become characteristics meant by the expressions attached thereto or characteristics suitable for the intended uses and contents.

FIGS. 4(a) and (b) show examples of the adjusting-quantity definition.

The example shown in FIG. 4(a) defines the adjustment of strengthening lightness by 2 points and contrast by 1 point so as to affix the psychological expression "vivid" by setting the adjusting range to −20 to +20 points. Incidentally, the example shown above refers to only an example and the attribute as well as the adjusting range is not restricted thereto.

The example shown in FIG. 4(b) is an modified one of what is shown in FIG. 4(a) and has an additional item designating document types in the definition. In this case, it is unnecessary for all the original copy types to be pre-defined and other types may be added by the user. When a document type is newly added, the exiting document type is designated so that the new one may be newly defined in a manner subordinate to the exiting one. The example shown in FIG. 4(b) refers to three kinds of adjusting-quantity definitions including "standard" as a standard setting with respect to every image, a preset "image" in this image processing apparatus and "portrait" to be defined by the user as a special example with respect to the "image" as far as the document type is concerned. The example shown in FIG. 4(b) further shows that the adjusting quantity of lightness and contrast in the case of "image" is determined by reference to the value set at the "standard, whereas the adjusting quantity of contrast in the case of "portrait" is determined by reference to the value set at the "image." Thus the adjusting-quantity definition is usable to set fine adjustment corresponding to a document type by allowing reference to the value of any other document type for a certain attribute.

<1-4: Calculation of Adjusting Level>

A description will subsequently be given of the contents of adjustment made in the image-processing execution unit 250.

This adjustment for the image entered includes the adjusting process of using (1) the adjusting-quantity definition made by the adjusting-quantity defining unit 223 to give added weight directly to the attribute recognition resulting from the image-attribute recognizing unit 214, (2) the automatic adjusting process of changing an internal parameter according to the adjusting-quantity definition made by the adjusting-quantity defining unit 223 and so forth.

Figure 5:
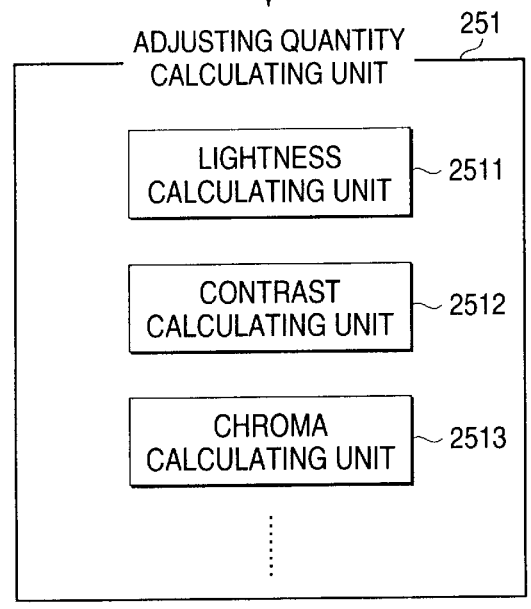
FIG. 5 includes a table showing the recognized results of the attribute by means of the image recognizing unit according to the embodiment of the invention (part (a)), a diagram illustrating an arrangement of an adjusting-quantity calculating unit according to the embodiment of the invention (part (b)), and a table showing the calculated results (part FIG. 6 shows a relationship between a lightness profile of an input image and a lightness profile resulting from adjustment to the former in the embodiment of the invention.

With respect to the adjusting method which belongs to (2) above, various sorts of approach are considered. When automatic adjustment corresponding to the result of the attribute recognition is made for the image data entered, for example, there is a case where the adjustment is tempered with the contents of the adjusting-quantity definition; an example of this will briefly be described by reference to FIGS. 5–7.

In the image data entered where lightness resulting from the attribute recognition obtained by the image-attribute recognizing unit 214 is as follows: minimum value $L_1=0$, mean value $L_2=160$ and maximum value $L_3=200$ as shown in FIG. 5(a), it is assumed the distribution of lightness of the image data is subjected to automatic adjustment so that $L_1'=0$, mean value $L_2'=128$ and maximum value $L_3'=255$. Although the contents of the automatic adjustment generally varies with the document type, the definition above is retained for convenience of explanation.

Subsequently, a lightness calculating unit 2511 constituting the adjusting-quantity calculating unit 251 (see FIG. 5(b)) obtains upper and lower limits in consideration of the respective attribute adjusting range with respect to the minimum value $L_1'$, mean value $L_2'$ and maximum value $L_3'$ after the adjustment is made. If the adjusting range is assumed to be −20%−+20% in this case, the upper and lower limits of the minimum value $L_1'=0$, the upper and lower limits of the mean value $L_2'=154$ and 102 and the upper and lower limits of the maximum value $L_3'=255$ and 204 are obtained (see FIG. 5(c)). Then an effective adjusting range is determined by the upper and lower limits above.

Figure 6:
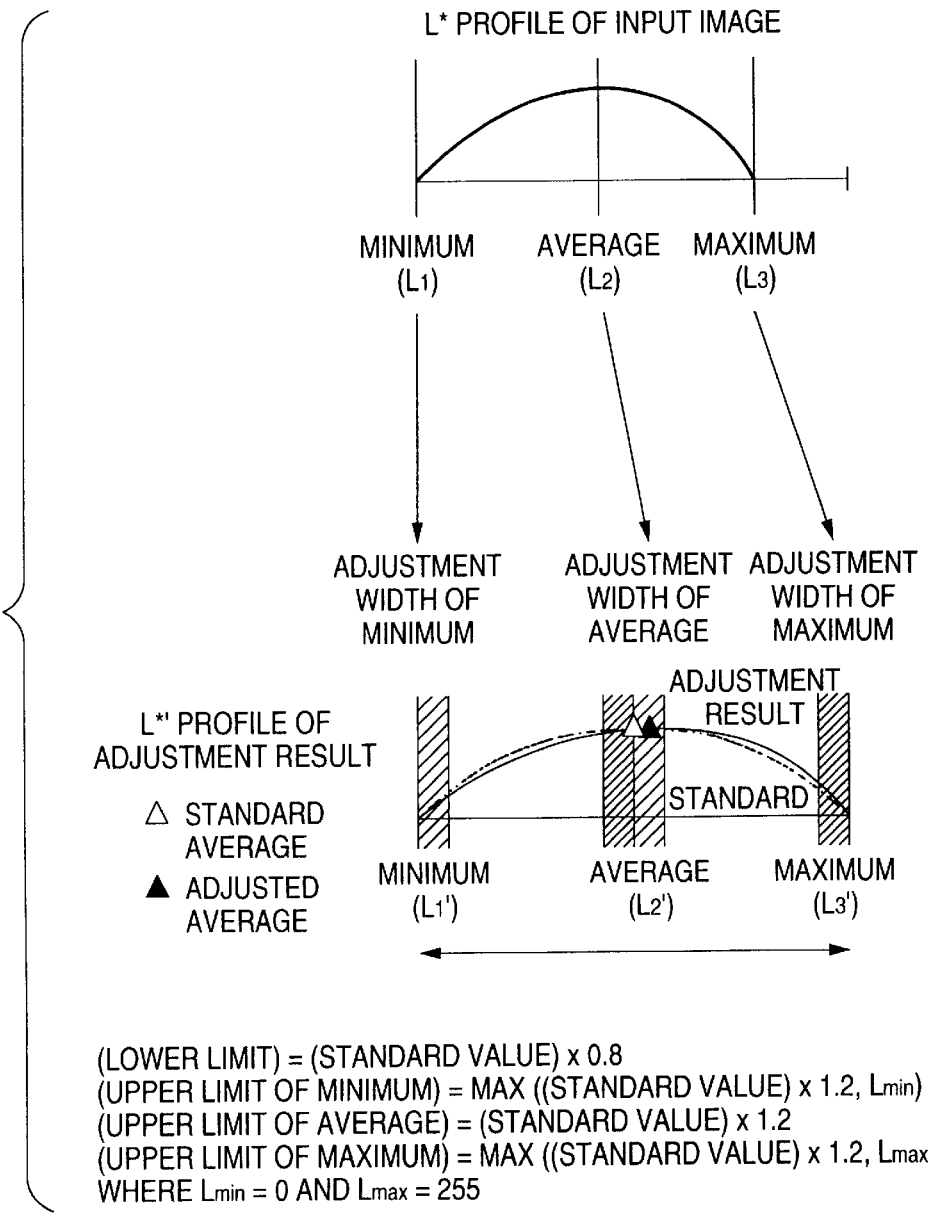
Figure 7:
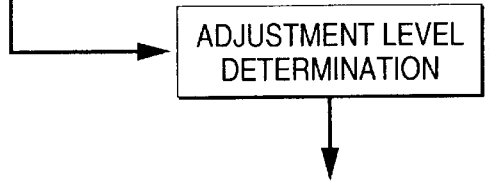
FIG. 7 includes a table showing the results of calculation made by the adjusting-quantity calculating unit according to the embodiment of the invention (part (a)); a table showing the exemplary definitions of adjustments according to the embodiment of the invention (part (b)); and a table showing the attribute decided by parts (a) and (b) and the attribute level according to the embodiment of the invention (part (c))

FIG. 6 shows the relationship among the minimum value $L_1$, mean value $L_2$ and maximum value $L_3$ before the adjustment is made, the minimum value $L_1'$, mean value $L_2'$ and maximum value $L_3'$ after the adjustment is made and their upper and lower limits. In this example, since the minimum value $L_1'$ is 0 after the adjustment is made, its upper and lower limits are also 0 and since the maximum value $L_3'$ is 255, which is the maximum value 255 shown by 8 bits, its upper limit is 255 as well.

Then the adjusting-quantity calculating unit 251 determines the final attribute to be processed by the image-processing application unit 252 and the adjusting level of the attribute by reference to the adjusting range thus obtained and the adjusting-quantity definition applied to the image concerned.

When the adjusting range thus obtained is identical with what is shown in FIG. 7(a) (identical with what is shown in FIG. 5(c)) and when the lightness set by the adjusting-quantity applied to the image is +2 points as shown in FIG. 7(b), the adjusting-quantity calculating unit 251, for example, adds a 10% value of ½ (i.e., effective adjusting width) of the effective adjusting range to each standard value to obtain the minimum value $L_1''=0$, mean value $L_2''=131$ and maximum value $L_3''=255$ of the final lightness distribution (see FIG. 7(c)). In this case, however, "+2 point" designating the lightness is assumed equivalent to 10% of the effective adjusting width.

Further, the image-processing application unit 252 performs the process of adjusting the image entered so as to establish the lightness distribution with the minimum value $L_1''=0$, mean value $L_2''=131$, and maximum value $L_3''=255$.

The adjusting-quantity definition is used to set the processing contents, whereby it is thus possible to define the adjusting quantity in a format which is not dependent on the input image.

An attribute other than lightness may needless to say be adjusted in the adjusting-quantity calculating unit 251. When an attribute other than lightness is recognized, an arrangement for calculating the attribute level may be made; for example, the adjusting-quantity calculating unit 251 may be equipped with a contrast calculating unit 2512 or a chroma calculating unit 2513 may be provided for adjusting contrast or chroma.

<1-5: Aggregate Area>

Figure 8:
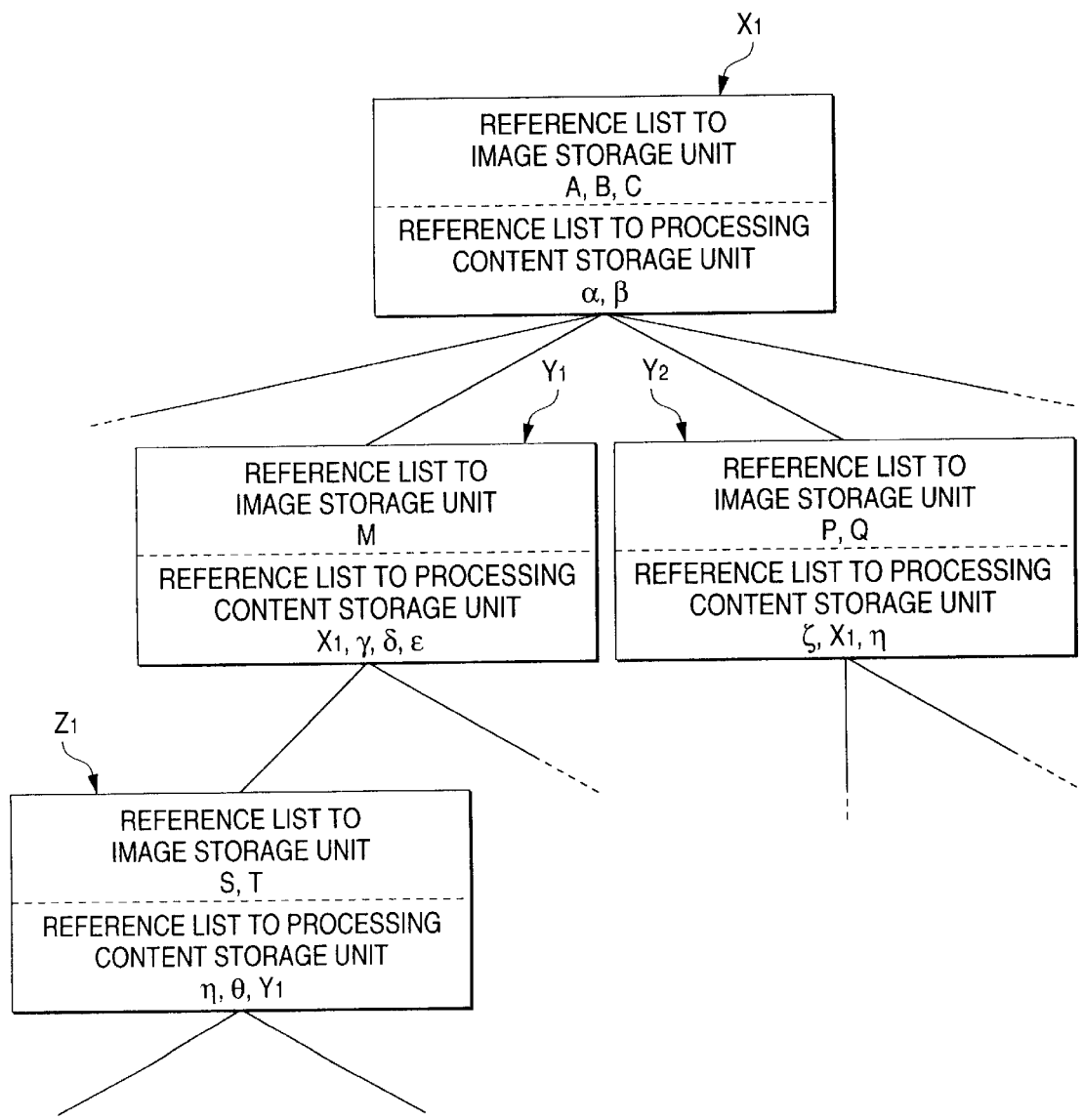
FIG. 8 is a diagram illustrating an aggregate area concept according to the embodiment of the invention.

The aggregate area concept according to the present invention will subsequently be described by reference to FIG. 8. As shown in FIG. 8, a plurality of aggregate areas are brought together to form a stratified structure. If one aggregate area is spotlighted, it is seen to comprise a "reference list to image storage unit" and a "reference list to processing-content storage unit."

Data for use in specifying the image stored in the aforementioned image storage unit 32 is listed in the "reference list to image storage unit" where a plurality of images can be registered therein, whereas data for use in specifying the processing contents stored in the processing-content storage unit 31 is listed in the "reference list to processing-content storage unit." In this case, the processing contents are listed in list structure in the order of processes to be performed including a primitive process (e.g., a simple process for increasing the red level by 10) and the aforementioned adjusting-quantity definition in combination. Therefore, a complicated process can be defined according to the objective and the alteration of the processing contents can readily be made by altering the list description.

The registered image which is independent in the stored condition and the processing contents can be connected together.

Not only the processing contents but also data indicating other aggregate areas may be listed in the "reference list to processing-content storage unit." In this case, the aggregate area regards a series of processing contents listed in another aggregate area as one process. When an aggregate area $Y_1$ is spotlighted, for example, a registered image M specified by the data listed in the "reference list to image storage unit" is connected to not solely the processing contents $\tau, \delta, \epsilon$ specified by the data listed in the "reference list to processing-content storage unit" of the aggregate area $Y_1$ but also the processing contents $\alpha, \beta$ in a high-order aggregate area $X_1$. The registered image M is connected to the processing contents $\alpha, \beta, \tau, \delta$ and $\epsilon$ after all.

When an aggregate area $Z_1$ is spotlighted likewise, the registered images S, T specified thereby are connected to not solely processing contents $\eta, \theta$ but also the processing contents $\tau, \delta, \epsilon$ in the high-order aggregate area $Y_1$ and also to the processing contents $\alpha, \beta$ in the further higher-order aggregate area $X_1$. The registered images S, T are connected to the processing contents $\eta, \theta, \alpha, \beta, \tau, \delta$ and $\epsilon$ after all.

Conversely, the aggregate area is subordinated to another aggregate area when the former is referred to the latter for processing contents.

Moreover, the processing contents referred to by an aggregate area may be referred to by an aggregate area in another branch; for example, processing contents $\eta$ may be referred to by not only the aggregate area $Z_1$ but also an aggregate area $Y_2$.

When data referred to the adjusting-quantity definition which designates a document type is listed in the "reference list to processing-content storage unit" of an aggregate area and when a plurality of images are registered in the "reference list to image storage unit" of the aggregate area, the attribute of each registered image is recognized and subsequently each of the adjusting ranges is obtained from the resulting attribute recognition. Further, an attribute for finally subjecting each registered image to processing and its adjusting level are obtained from the attribute corresponding to the document type of the registered image and its adjusting quantity.

Figure 9:
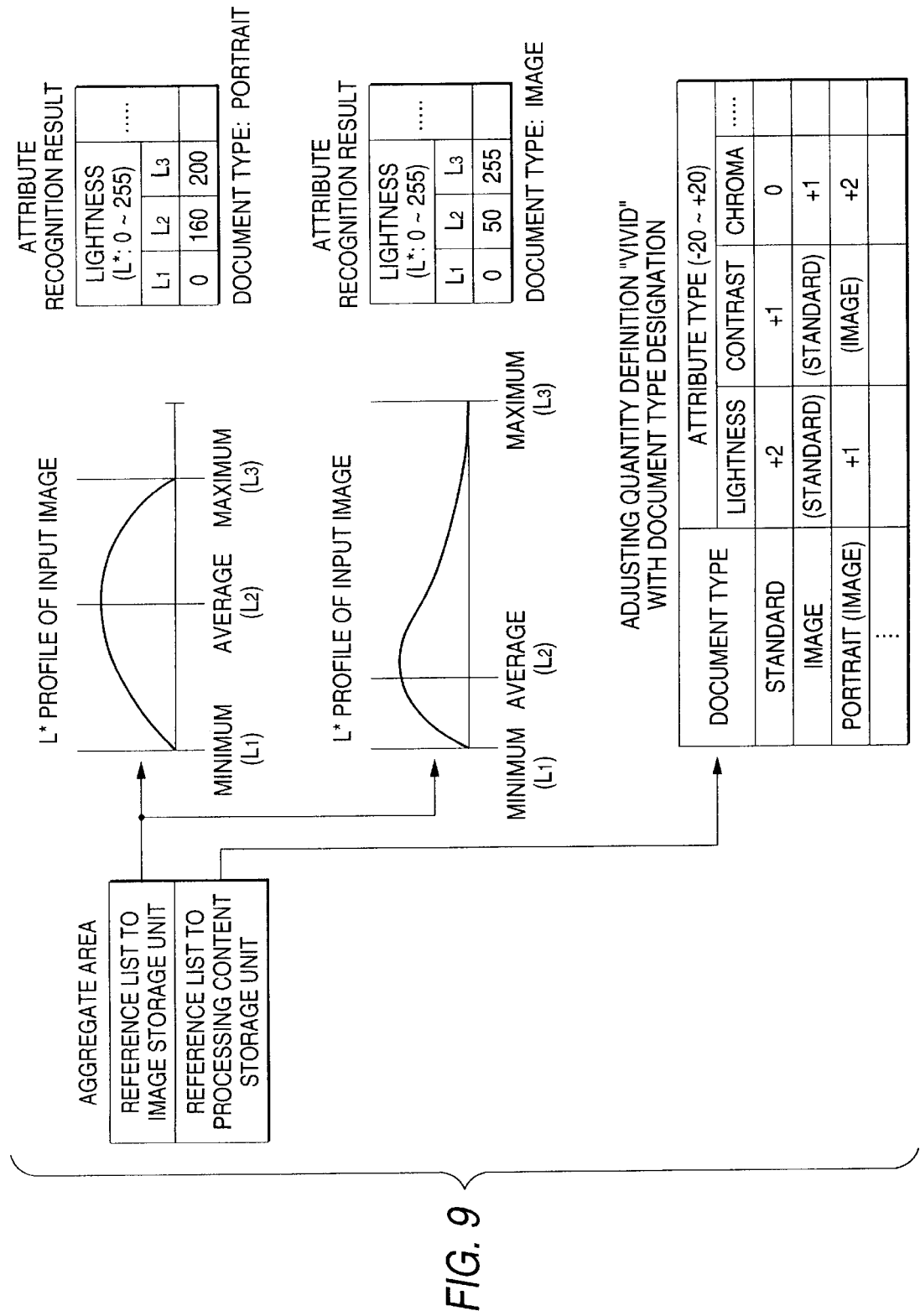
FIG. 9 is a diagram illustrating the relationship between the image and the adjusting-quantity definition connected by the aggregate area according to the embodiment of the invention.

As shown in FIG. 9, for example, it is assumed that the adjusting level of the lightness of a document type of the portrait in the adjusting-quantity definition referred to the "reference list to processing-content storage unit" of the aggregate area is +1 point and that the adjusting level of the lightness of a document which is of the image type is +2 point. Further, it is assumed that when two images have been listed in the "reference list to image storage unit" of the aggregate area, the lightness of the one image is as follows: minimum value $L_1=0$, mean value $L_2=160$ and maximum value $L_3=200$; and the document is of the portrait type and that the lightness of the other image is as follows: minimum value $L_1=0$, mean value $L_2=50$ and maximum value $L_3=255$; and the document is of the image type.

Figure 10:
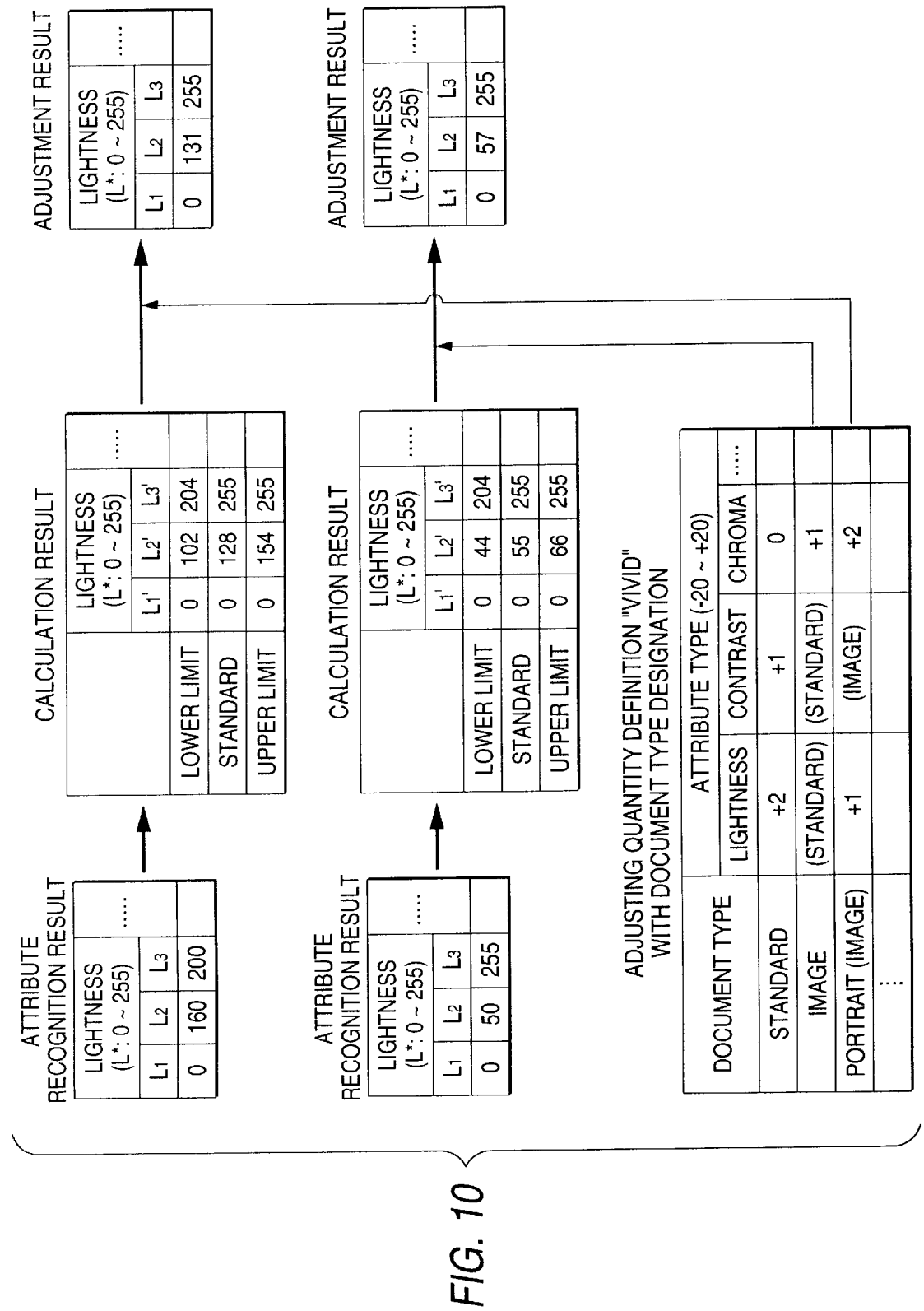
FIG. 10 is a diagram illustrating processing contents when the image and the adjusting-quantity definition are connected by the aggregate area according to the embodiment of the invention.

According to the method above, the adjusting range of each image is obtained as shown in FIG. 10: with respect to the one image, the upper and lower limits of the minimum value $L_1'=0$, the upper and lower limits of the mean value $L_2'=154, 102$ and the upper and lower limits of the maximum value $L_3'=255, 204$; and with respect to the other image, the upper and lower limits of the minimum value $L_1'=0$, the upper and lower limits of the mean value $L'_2=66, 44$ and the upper and lower limits of the maximum value $L'_3=255, 204$. The adjusting ranges thus obtained are different from each other because the input images are different.

With these effective adjusting widths and the adjusting level of the corresponding document type in the adjusting-quantity definition, the final attribute (lightness in this case) to be processed and the attribute level with respect to each image are obtained so that the lightness distribution in the one image may be arranged with the minimum value $L_1''=0$, mean value $L_2''=131$ and maximum value $L_3''=255$ and that the lightness distribution in the other image may be arranged with the minimum value $L_1''=0$, mean value $L_2''=57$ and maximum value $L_3''=255$.

Thus the adjusting-quantity definition is adapted for use in causing the processing contents set thereby to be properly reflected in images having different attributes.

The adjusting-quantity definition referred to by the "reference list to processing-content storage unit" of the aggregate area is not limited to one but may a plurality of them.

When a plurality of adjusting-quantity definitions are referred to, it is ruled to select one of the following cases: (1) the plurality of adjusting-quantity definitions are referred to in sequential order; (2) the adjusting-quantity definitions in combination are referred to; or otherwise (3) either (1) or (2) is selectively used. Information as to designating one of the cases above may be contained in the adjusting-quantity definition. When the plurality of adjusting-quantity definitions are combined together (2), they may be transformed so as to optimize them.

When the rules above are not designated until the application of the image processing, (1) the user may be inquired of information or otherwise (2) any one of the preset rules may be used.

Since such an aggregate area is adapted for connecting the processing contents (including the adjusting-quantity definition) connected to a registered image to another registered image, it is possible to plan the reutilization of the processing contents. Moreover, the processing contents are described literally in list structure and consequently complicated processing can be defined for the intended purpose. The processing contents can readily be altered by altering the description of them likewise. Further, a plurality of images can be arranged in order and sorted out according to the purpose and the kind by forming the aggregate area by objectives.

When the registered image and the processing contents are connected by the aggregate area, the processing contents connected to the registered image by the aggregate area and the high-order aggregate area are executed or a tag indicating the processing contents is attached to the registered image which is then output, the registered image being referred to by the aggregate area by making the aggregate area an output object in the output operation, which will be described later.

A new aggregate area like this can newly be prepared by setting the aggregate area as will be described later. Further, the alteration, erasure, or addition of the contents of each reference list are extremely easy.

Although the most significant aggregate area is one as shown in FIG. 8, a plurality of aggregate areas in stratified structure may be formed.

<2: Operation>

The operation of the processor 20 according to the present invention will subsequently be described. A so-called GUI (Graphical User Interface) is adopted as the interface between the processor 20 and the display unit 21. More specifically, various icons and windows are displayed on the display unit 21 and varieties of inputs and settings are carried out when the user operates a pointing device such as a mouse.

Figure 11:
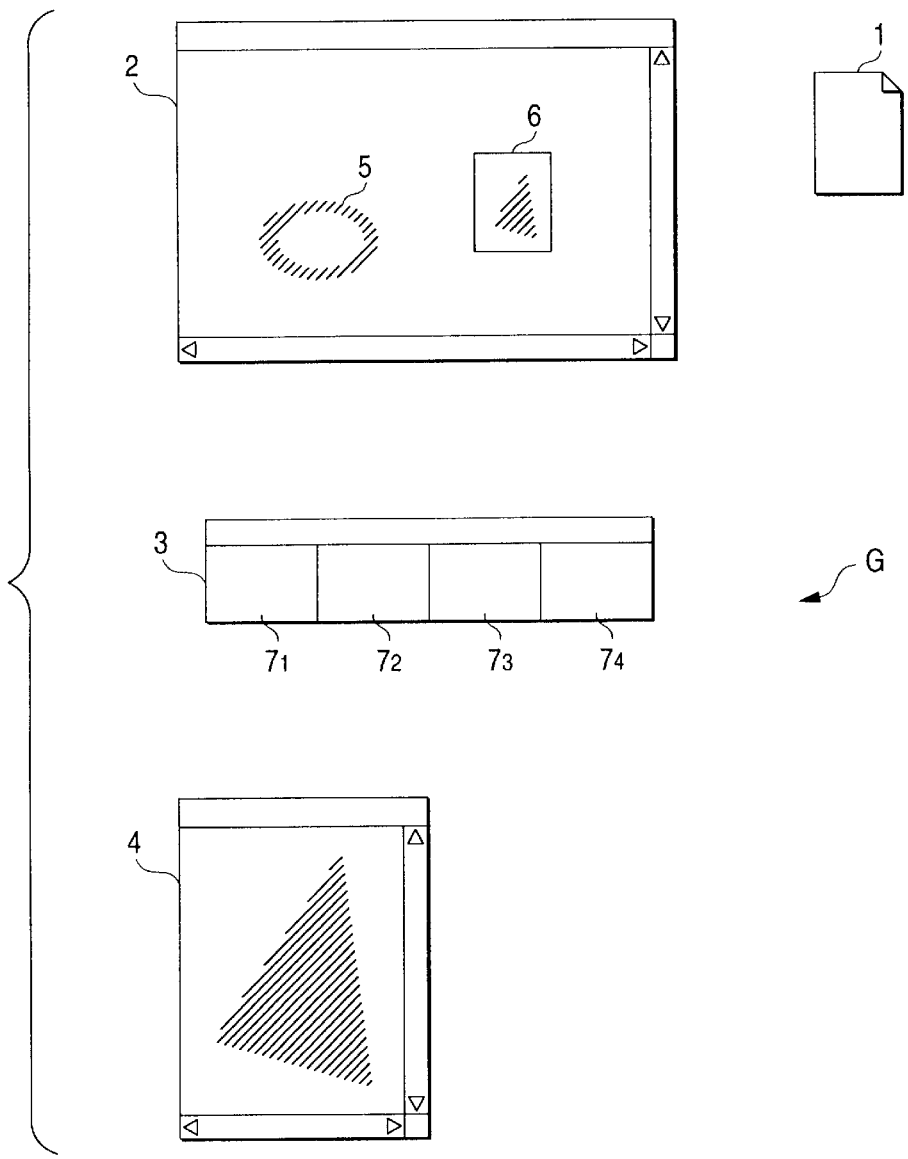
FIG. 11 is a diagram illustrating an example of a display by means of a display unit according to the embodiment of the invention.

An example of a screen on the display unit 21 will be described by reference to FIG. 11. As shown in FIG. 11, various icons, windows and the like are displayed on the screen G of the display unit 21. In FIG. 11, reference numeral 1 denotes an image file icon, indicating the image file entered; 2, a processing window for designating an image as an object to be processed and an aggregate area; 3, a functional window having functional buttons $7_1$–$7_4$ corresponding to respective processing contents; 4, a display window for making certain of the results of processing of the whole or part of an image.

The following six processes are mainly performed in the processor 20 and the UI unit 200 monitors the user's operation and detects an event if any, thus allowing a process corresponding to the operation concerned to be performed.

<2-1: Image Reading>

While image processing is carried out, an image as an object to be processed needs reading. The process of reading an image will be described first. The reading operation includes information entry necessary for an image to be specified and preparation of a thinned image for displaying. In a system including the processor 20, a suitable (easy to handle) format is employed for the thinned image and when an original image is large, it is preferred to reduce the image within the permitted limit of deterioration of display quality. The reason for using such a thinned image is to satisfy both of the display quality of an image to be processed and the response speed of processing.

First, the image reading is designated by designating the image file icon 1 and the processing window 2 with reference to FIG. 11. More specifically, an icon indicating a desired image out of the image file icon 1 displayed when entered is moved by dragging into the processing window 2. The dragging operation includes designating a desired icon or the like by pressing a mouse button down, moving the icon while keeping the mouse button held down and releasing the mouse button from being pressed when a desired spot is reached. The designation of image reading may be made by executing a standardized file designation program provided by the OS or communicating with any other application.

Figure 12:
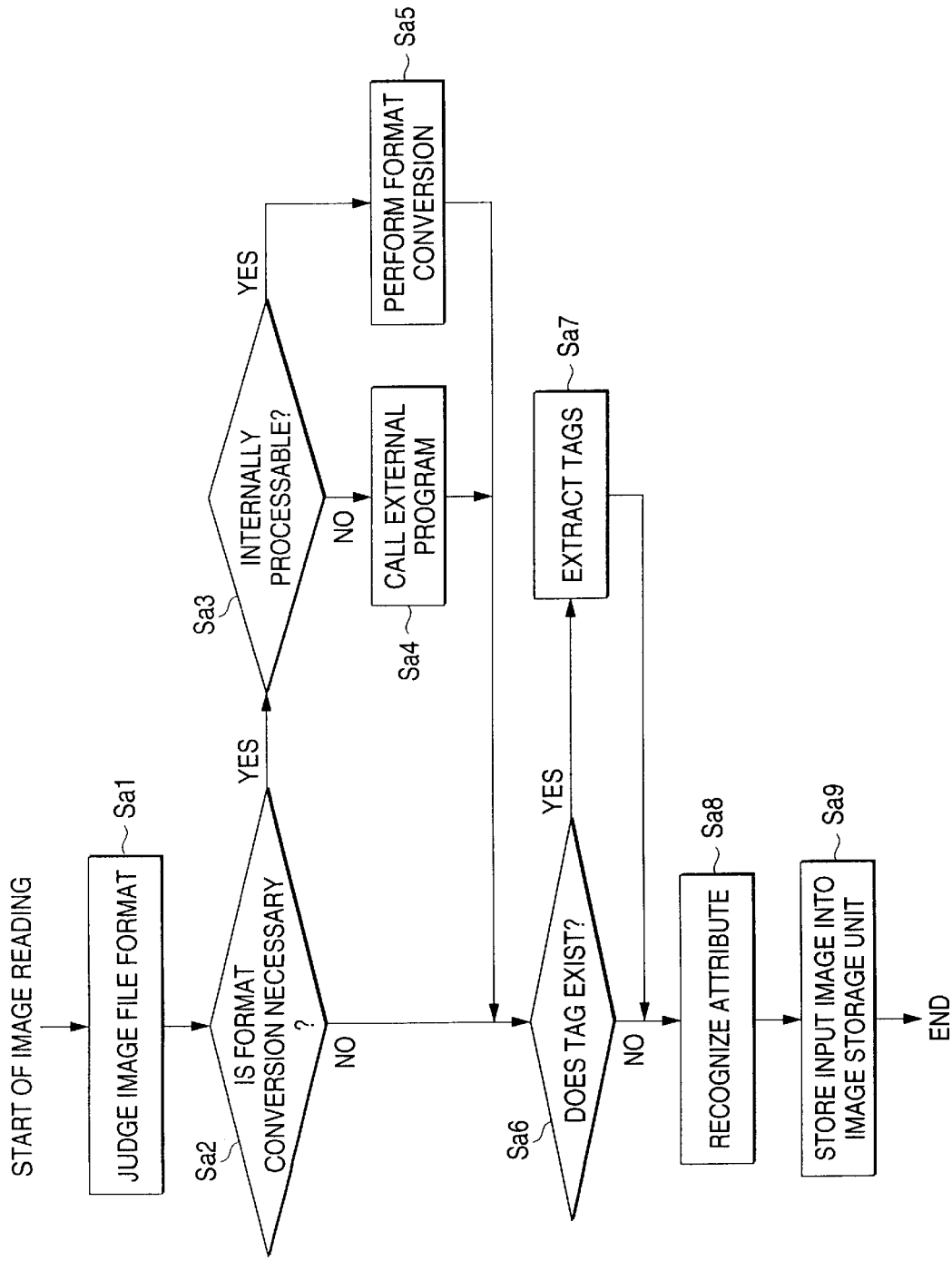
FIG. 12 is a flowchart illustrating an image reading operation according to the embodiment of the invention.

When the UI unit 200 detects that the user has performed the operation of reading an image, the image input-output unit 210 inputs an image as an object to be processed through the operation above and the process of reading the image is performed as shown in FIG. 12.

At STEP Sa1, first, an input image file format as intended for reading because of the operation concerned is decided. Various methods of deciding such a file format are considered, for example, a decision to be made may be based on information about the file type included in the file, classification of extensions of file names or analysis of the file organization.

At STEP Sa2, further, a decision is made on whether the file format of an input needs a format conversion process. This is because it is necessary to convert a file format to what is processable by the processor 20 beforehand when that file format which is not assumed thereby is input to the processor 20.

When the conversion process is decided necessary in this case, a decision is made on whether the file format is convertible in the processor 20 at STEP Sa3. When the decision made is "No," an external program is called at STEP Sa4, so that the input file is converted into a processable convertible format, whereas when the decision thus made is "Yes," the input file is converted to such a processable convertible format by reference to the image format converting library 41 at STEP Sa5.

When the file format is thus converted or when the input file is what has originally needed no conversion, an thinned image is formed on the display window 4 and at STEP Sa6, a decision is made on whether the input file has a tag. The tag in this case means not only information indicative of the attribute and the like of the input image but also what is indicative of its processing contents according to the present application as will be described later; in other words, the tag means what is attached to the input file. However, such a tag may be stored in a file other than what is stored with the image in some cases.

As the tag thus attached to the input file may be of no use, the decided result is "No" then and when a useful tag is attached thereto, on the other hand, it is extracted by the tag extracting unit 211 at STEP Sa7.

At STEP Sa8, further, the attribute of the input image is recognized by the image-attribute recognizing unit 214 and the document type of the input image is also decided. In this case, the document type may be recognized automatically by the image-attribute recognizing unit 214 on the basis of statistical analysis using histogram, designated by the user or decided by use of both methods.

At STEP Sa9, further, the input image in a processable format is stored in the image storage unit 32 under the control of the image control unit 230 and on condition that the tag has been extracted, the tag is stored in the processing-content storage unit 31 under the control of the processing-content control unit 220.

Therefore, the input image can be specified by reference to the (converted) file name, the stored address and so forth, so that the thinned image is displayed on the display window 4. Moreover, an image icon 6 indicating the image is displayed in the processing window 2, whereby it is shown to the user that the image is an object to be processed.

<2-2: Setting (fresh preparation) of Aggregate Area>

The operation of setting an aggregate area (see FIG. 8) will subsequently be described. A designation to the effect that the aggregate area is set is made in such a manner that apart from the processing contents, the buttons 7 corresponding to the setting of aggregate areas are allocated to the functional window 3 of FIG. 11, for example, so that the designation thereof is effected by making the user click the mouse button. Otherwise, a menu is displayed on the screen so as to allow the selection to be made.

Figure 13:
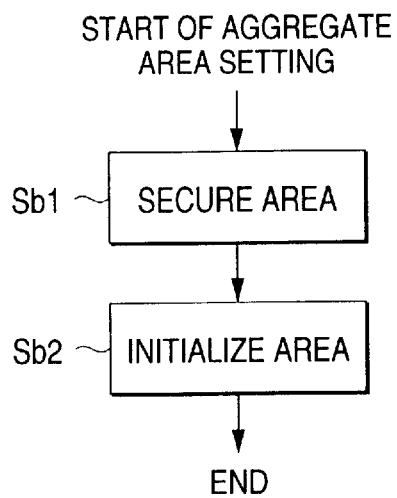
FIG. 13 is a flowchart illustrating an aggregate-area setting operation according to the embodiment of the invention.

When the UI unit 200 detects an operation to the effect that a new aggregate area is newly prepared by the user, the process of setting the aggregate area is performed as shown in FIG. 13. At STEP Sb1, an area is secured in the aggregate area storage unit 33 and at STEP Sb2 then, initialization is conducted by the aggregate area control unit 240.

When an aggregate area is thus prepared, the display of an aggregate area icon 5 accompanied with the preparation of such a new aggregate area is made in the processing window 2 on the screen G of FIG. 11. Consequently, the fact that the aggregate area becomes an object to be processed is shown to the user.

In this setting process, only the new aggregate area is prepared and the process of connecting the registered image, the processing contents or the high-order aggregate to the aggregate area is actually performed in the stages of processing-content definition and image registration which follow subsequently.

<2-3: Processing-content Definition>

Then the operation of the processing-content definition will be described. The processing-content definition means setting the contents of adjusting-quantity definition and defining the processing contents to be applied to the aggregate area or the registered image. A designation to the effect that the processing contents are defined is effected by, for example, designating the aggregate area icon 5 or the image icon 6 and selecting one of the functional buttons of the functional window 3, to which button desired processing contents have been allocated. More specifically, the icon of the image or the aggregate area that should define the processing contents is moved by dragging to the desired functional button of the functional window 3.

Figure 14:
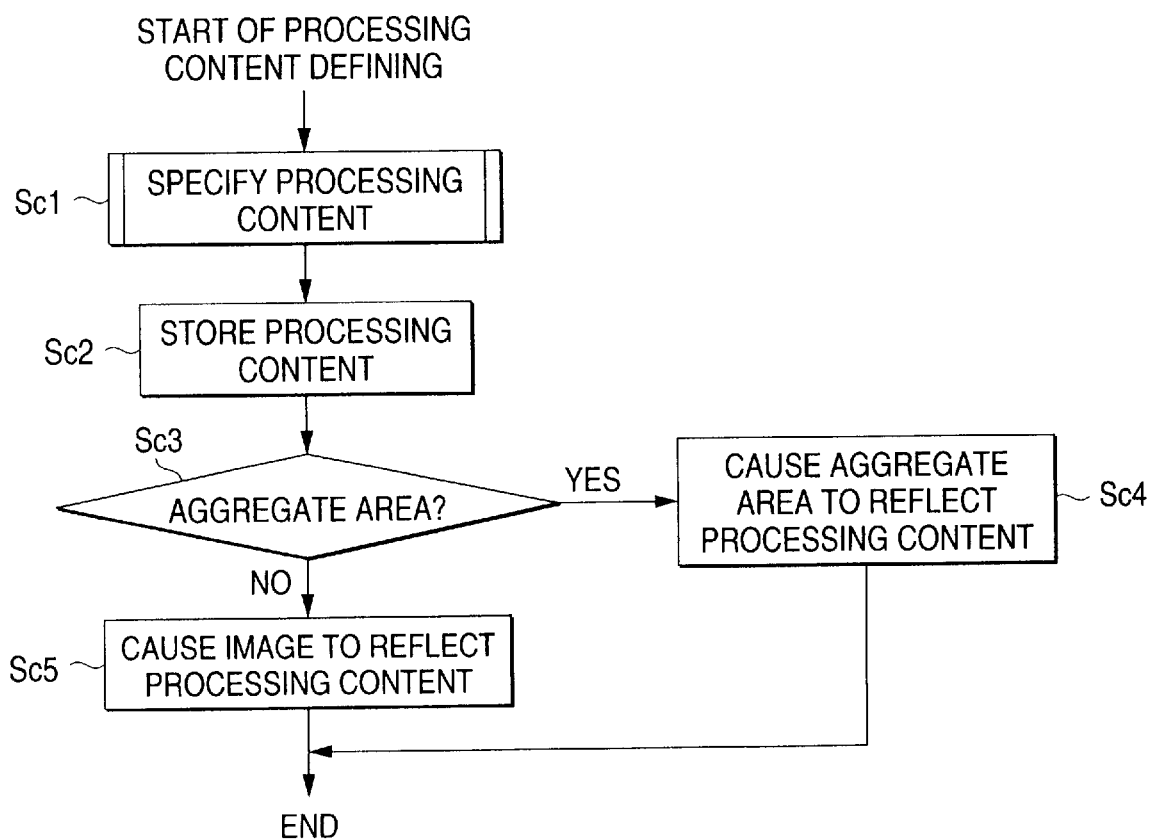
FIG. 14 is a flowchart illustrating the operation of defining processing contents according to the embodiment of the invention.

When the UI unit 200 detects an operation to the effect that the processing contents are defined by the user for the aggregate area, the process of defining the processing contents is performed as shown in FIG. 14.

At STEP Sc1, first, the contents of adjusting-quantity definition is set or the processing contents to be applied to the aggregate area or the registered image are defined and when the processing contents are designated, the contents are stored in the processing-content storage unit 31 under the control of the processing-content control unit 220 at STEP Sc2. The operation in a case where the contents of adjusting-quantity definition are set at STEP Sc1 will be described later.

As described above, the processing contents of either aggregate area or image are defined in this case. Although consideration may be given to a case where the adjusting-quantity definition is directly applied to the input image, the processing contents of the adjusting-quantity definition are applied to the image referred to the image storage unit with the reference list when the adjusting-quantity definition is listed in the "reference list to processing-content storage unit" of the aggregate area, so that the processing contents of the aggregate area are defined even when the adjusting-quantity definition is used.

Incidentally, where the processing contents of the aggregate area are defined, it is meant that the collective connection of the designated processing contents to the registered image referred to by the aggregate area is instructed, whereas when the processing contents of the image are defined, it is also meant that the collective connection of the designated processing contents to the registered image referred to by the aggregate area is instructed.

At STEP Sc3, further, a decision is made on whether an object to be processed is an aggregate area. When the object processed is an aggregate area as a result of decision made, the designated processing contents are added to the "reference list to processing-content storage unit" of the aggregate area at STEP Sc4, whereas when an object to be processed is not an aggregate area, it is an image and the designated processing contents are connected to the image.

The processing-content definition also includes alteration. When the aggregate area icon 5 or the image icon 6 is designated in FIG. 11, for example, the processing contents set thereto are displayed in the form of a list, which is made rewritable by the user. Only when the processing order is simply altered, it is only required for the user to change the order of list description.

<2-3-1: Designation of Processing Contents>

Figure 15:
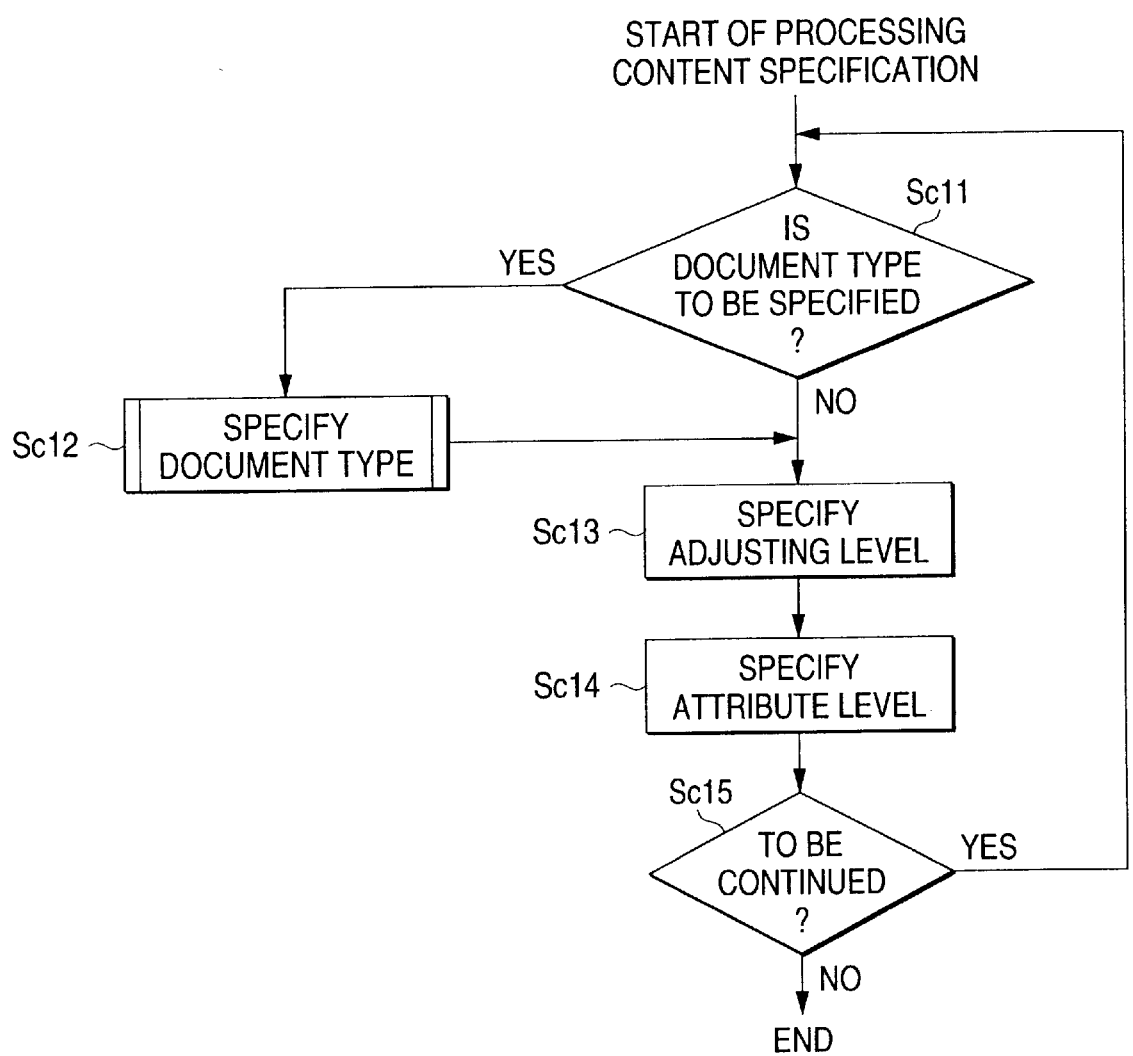
FIG. 15 is a flowchart illustrating the operation of designating processing contents according to the embodiment of the invention.

The operation of setting the contents of the adjusting-quantity definition at STEP Sc1 will subsequently be described by reference to FIG. 15.

At STEP Sc11, first, a decision is made on whether a document type is designated in the setting operation. More specifically, the processor 20 causes a message of inquiring of the user whether to designate the document type to be displayed on the display unit 21 and makes a decision based on the user's reply. When a document type is to be designated as a result of the decision made, a process at STEP Sc12, which will be described later, is performed to set the adjusting-quantity definition as shown in FIG. 4(b) and the document type is designated thereat. When the document type is not to be designated or when the document type has been designated, on the other hand, the following process is performed to set the detailed contents of the adjusting-quantity definition.

At STEP Sc13, further, a specific adjusting level out of the adjusting-quantity definition is designated by the user and at STEP Sc14, an image attribute at the adjusting level is designated, whereby the image attribute and the adjusting level of that attribute are designated.

At STEP Sc15, further, a decision is made on whether the adjusting-quantity definition as an object to be set at that point of time is continuously set or not. Like STEP Sc11, the processor 20 causes a message of inquiring of the user whether to continue setting the adjusting-quantity definition to be displayed on the display unit 21 and makes a decision based on the user's reply also in this case. When the setting is to be continued as a result of the decision made, the processor 20 returns the processing flow to STEP Sc11 to have the setting continued, whereas when it is not to be continued, the processor 20 has the designation terminated and makes the processing procedure move to STEP Sc2 (see FIG. 14).

When the adjusting-quantity definition thus set is supplied with expressions indicating the meaning of its characteristics, uses and contents, they are set at either STEP Sc14 or STEP Sc13.

<2-3-1-1: Document Type Designation>

Figure 16:
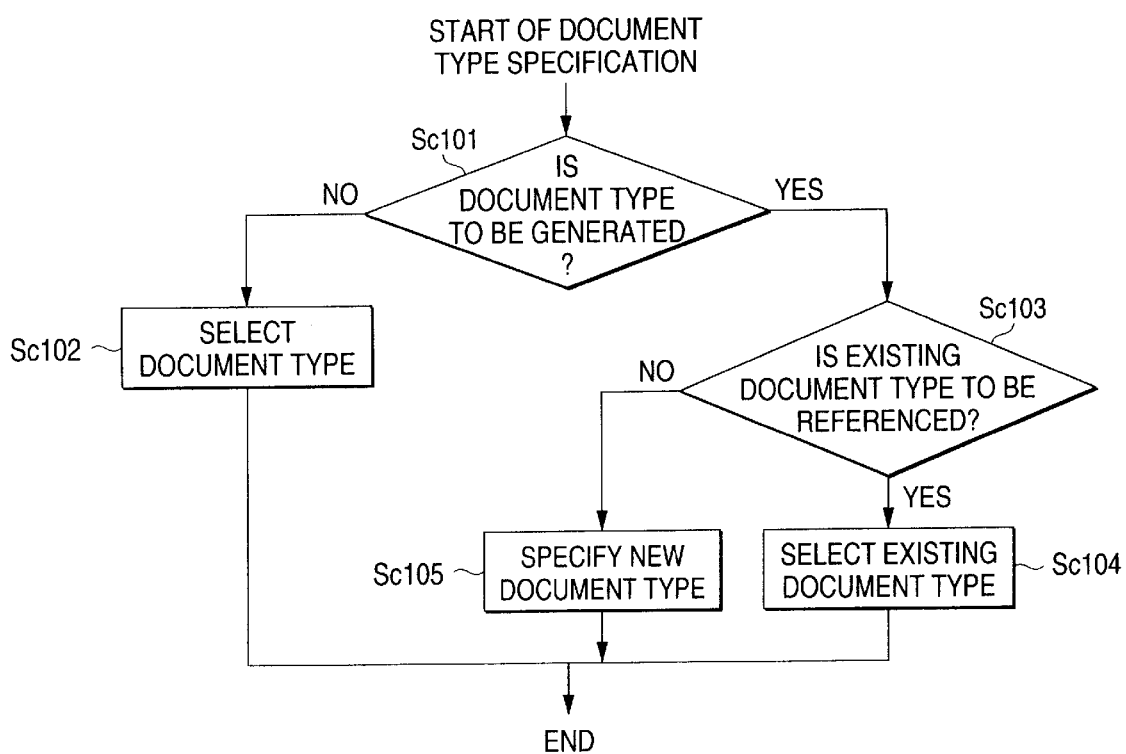
FIG. 16 is a flowchart illustrating the operation of designating an original copy type according to the embodiment of the invention.

The operation of designating the document type at STEP Sc12 will subsequently be described by reference to FIG. 16.

At STEP Sc101, first, a decision is made on whether a document type is newly prepared when the document type is designated. Like STEP Sc11 and STEP Sc15, the processor 20 causes a message of inquiring of the user whether to prepare a new document type to be displayed on the display unit 21 and makes a decision based on the user's reply also in this case. When a new document type is not to be newly prepared, it means user's modifying the contents corresponding to the existing document type as a result of the decision made and at STEP Sc102, the document type is selected by the user. The attribute of the document type thus selected and the adjusting level of the attribute are set at STEP Sc13 and STEP Sc14 (see FIG. 15).

When a new document type is newly prepared, on the other hand, items corresponding to the new document type are added in the adjusting-quantity definition at STEP Sc103 and a decision is made on whether the new document type is referred to the existing document type. When the new document type is to be referred to the existing document type, the document type to be referred to is selected by the user at STEP Sc104, and the attribute of the document type thus referred to as well as its adjusting level is set at STEP Sc13 and STEP Sc14 (see FIG. 15). When the existing document type is not to be referred to, the attribute of the new document type as well as its adjusting level is set at STEP Sc13 and STEP Sc14 (STEP Sc105; see FIG. 15).

Thus the contents of processing applicable to the aggregate area or the registered image are directly defined for the processing-content definition at STEP Sc1 and the processing contents are designated. Further, the contents of the adjusting-quantity definition are set as shown in FIG. 15 and the document type is set as shown in FIG. 16, whereby the processing contents to be applied to the input image are determined.

<2-4: Image Registration>

The operation of registering an image will subsequently be described. There are two cases where, firstly, an image is registered in an aggregate area and where, secondly, the aggregate area is made subordinate to another aggregate area.

The image registration is made by designating the aggregate area icon 5 and the image icon 6 in FIG. 11, for example, in the first case. More specifically, an image icon corresponding to an image to be connected is stacked by dragging on an aggregate area icon corresponding to an aggregate area as the other party.

In the second case, moreover, an aggregate area icon corresponding to an aggregate area as a subordinate one is stacked by dragging on an aggregate area corresponding to an aggregate area as a destination aggregate area.

Figure 17:
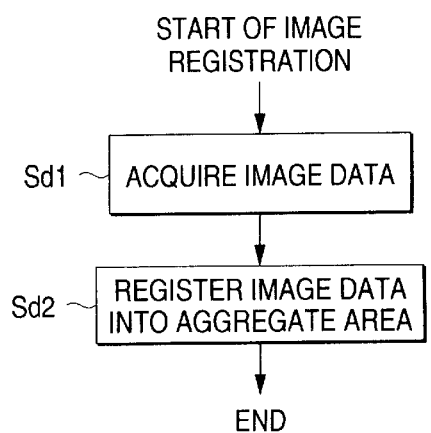
FIG. 17 is a flowchart illustrating the operation of registering an image according to the embodiment of the invention.

When the UI unit 200 detects an operation to the effect that an image is registered by the user, the process of registering the image is performed as shown in FIG. 17. In the first case, data which specifies an image to be registered is read from the image storage unit 32 at STEP Sd1 and the data is added to a "reference list to registered-image storage unit," whereby the aggregate area and the registered image stored in the image storage unit 32 are connected.

In the second case, data specifying the destination aggregate area is read from the aggregate area storage unit 33 at STEP Sd1 and added to the "reference list to processing-content storage unit" of the subordinate aggregate area, whereby the subordinate aggregate area and the destination aggregate area are connected.

As described above, a plurality of registered images can be connected to the aggregate area according to this embodiment of the invention by listing a plurality of data specifying images in the "image-storage reference list" (see FIG. 8). Moreover, it is possible to have a plurality of low-order aggregate areas subordinated to one aggregate area.

<2-5: Processing Result Display (preview)>

The process of displaying the results will subsequently be described. The process of displaying the results is a process for showing the user an image resulting from applying processing contents to the original image entered by applying the defined processing contents to a thinned image. This process is performed in company with the aforementioned processing-content definition or image registration.

Figure 18:
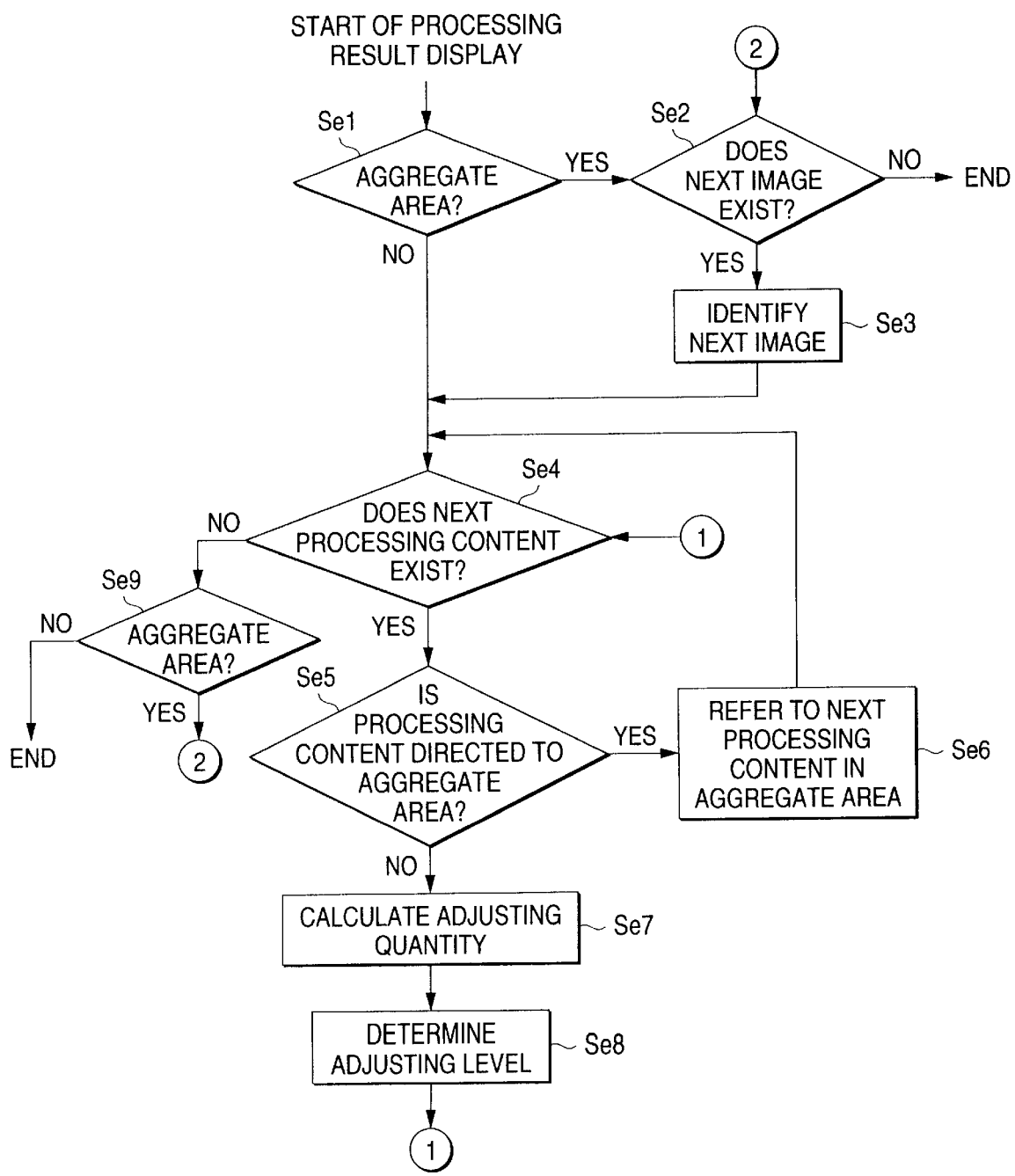
FIG. 18 is a flowchart illustrating the operation of displaying processed results according to the embodiment of the invention.

When the UI unit 200 detects what has been predetermined and causes the operation of the aforesaid processing-content definition or image registration to be performed, the incidental processing result display shown in FIG. 18 is performed. At STEP Se1, first, a decision is made on whether an object to be processed is an aggregate area. As noted above, there are two cases where the intended object is an aggregate area and where it is an image irrespective of which one of the processing-content definition and the image registration is in question. Therefore, a decision is made on whether the designation is directed to the aggregate area.

When the designation of alteration is directed to an aggregate area, the aggregate area is read from the aggregate area storage unit 33 at STEP Se2 and a decision is made on whether the registered image specified by the data listed in the "reference list to image storage unit" exists. In a case where the registered image is absent, this process is terminated, whereas when it exits, it is specified by the image control unit 230 according to the data listed in the list concerned at STEP Se3.

When the registered image is specified, when the designation is directed to the image or when a process at STEP Se8, which will be described later, is terminated, a decision is made on whether the processing contents of the aggregate area referred to by the registered image exit by reference to the processing-content storage unit 31 at the next STEP Se4. When the processing contents exist in this case, further, a decision is made on whether the processing contents correspond to the aggregate area at STEP Se5. When the processing contents do not correspond to the aggregate area, the process is performed for the thinned image displayed according to the corresponding specified image at STEP Se7 and STEP Se8 since the processing contents indicate a process itself including adjusting-quantity definition.

More specifically, when the processing contents signifies adjusting-quantity definition, the adjusting-quantity calculating unit 251 calculates, at STEP Se7, an adjusting range applicable to subjecting the specified image to processing from the result of recognizing the attribute of the specified image and the adjusting-quantity definition. At STEP Se8, further, the final attribute to be processed and the adjusting level of the attribute are determined by reference to the adjusting range thus obtained and the adjusting-quantity definition applicable to the image. The processing contents thus determined are executed for the thinned image displayed according to the corresponding specified image, so that a preview display is provided. When processing contents are primitive, moreover, the processing contents are executed for the thinned image displayed according to the corresponding specified image, so that the preview display is provided.

These processes of displaying the results ranging from STEP Se1 to STEP Se9 are still intended for the preview display and the processing contents are actually applied to the specified image only in an output process which will be described later.

Then STEP Se8 is followed by STEP Se4 again, so that a similar preview display is provided for the next image referred to in the aggregate area.

When the processing contents correspond to the aggregate area at STEP Se5, on the other hand, the processing contents of the aggregate area are referred to at STEP Se6 and STEP Se4 is followed again to perform a similar decision process for the processing contents thus referred to.

When the processing contents of the aggregate area referred to the registered image becomes nonexistent at STEP Se4, a decision is made again on whether the initial designation has been given to the aggregate area at STEP Se9. The decision-making is thus repeated because a plurality of images may be registered in the aggregate area. When the decision made results in "Yes," STEP Se2 is followed again to perform the same process for another image, whereas when it results in "No," the processing operation is terminated as there is no image to be processed.

In the result display process like this, when the processing-content definition and the image registration are provided for an image, the process intended for the image is performed for the thinned image over a course: STEP Se1→4→5→7→8→4→ . . . repetition . . . →4→5→6→4→9 and shown to the user. When the designation of alteration is directed to the aggregate area, further, the process applied to one image is performed for the thinned image over a course: STEP Se1→1→2→3→4→5→7→8→ . . . repetition . . . →4→5→6→4→9 and shown to the user. For another image, the process based on the decision at STEP Se9 is performed through a similar course and shown to the user.

In other words, the preview display subject to the processing contents is made for all the images defined in processing contents or involved in registration.

Although the processing order is such that the processing contents are specified after the image as an object to be processed is specified as shown in FIG. 18, that order may needless to say be reversed.

<2-6: Output>

The output operation will subsequently be described. When the processing contents are confirmed by the display of the thinned image, the output process actually used to apply the processing contents to an original image is performed. The following two methods are assumed as output methods according to this embodiment of the invention. In other words, with the contents of image processing as a tag, a first method is to output the tag by burying it in an image file to which the processing contents are applied, and a second method is to output the image entered by actually applying the processing contents thereto. The former is adapted to delaying the image processing which needs an enormous amount of calculation until the final output time so as to obtain a high-quality image output by use of a special high-performance output unit for executing the output. Whereas the latter allows all the processing contents defined at the stage of document completion to be collectively processed with respect to the corresponding image, though it actually performs image processing and further has merits in building a system less costly because no special output unit is required.

The designation of the output operation is effected by, for example, designating the aggregate area icon 5 or the image icon 6 and allocating the button 7 corresponding to the output operation apart from the processing contents to the functional window beforehand so that the user is allowed to select the mouse button or the like; that is, the designation thereof is effected by stacking an icon corresponding to an image to be output or an aggregate area on the functional button concerned. Otherwise, the menu is displayed on the screen through a predetermined operation so that a desired icon may be selected.

Figure 19:
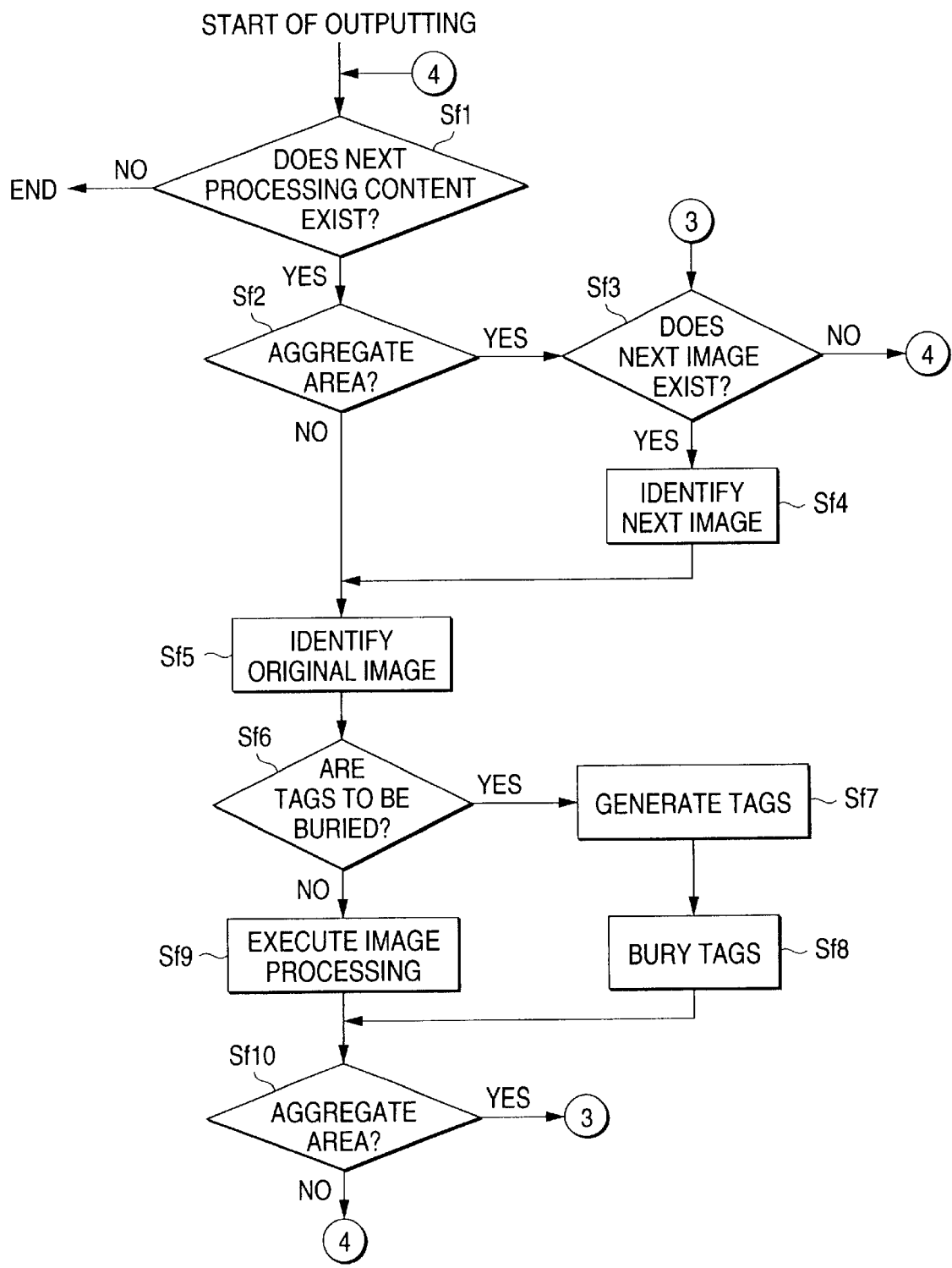
FIG. 19 is a flowchart illustrating an output operation according to the embodiment of the invention.

When the UI unit 200 detects an operation to the effect that the output operation is performed by the user, the output process shown in FIG. 19 is performed. At STEP Sf1, first, a decision is made on whether the processing contents as an object to be output exists by reference to the processing-content storage unit 31. When the processing contents are absent then, the output operation is terminated because the following steps are unnecessary to take, whereas when the processing contents exist, a decision is made on whether the aggregate area is an object to be output at STEP Sf2. When the aggregate area is an object to be output, it is decided whether what has not been output and remains unprocessed out of the images registered in the aggregate area is left through the retrieval operation of the aggregate area control unit 240 at STEP Sf3. When the result thus decided is "No," no unprocessed registered image exits. However, there may be a case where the aggregate area is subordinated to a high-order aggregate area, STEP Sf1 is followed again. In this case, the object is moved to the high-order aggregate area, whereas when the result thus decided is "Yes" at STEP Sf3, one of the unprocessed images is specified at STEP Sf4.

At STEP Sf5, further, since an image to be processed has been specified, the image data on the image concerned is specified by the image control unit 230 and called from the image storage unit 32.

At STEP Sf6, a decision is made on whether the tag is buried. In other words, a decision is made on whether the output method is implemented by means of the aforementioned first or second method. However, such a decision may be made by letting the user perform the predetermined operation with the screen arranged for allowing the user to select one of the methods above for outputting purpose or otherwise by means of the condition preset according to this embodiment of the invention.

When the tag is buried as a result of the decision, a tag indicative of the processing contents of the image is created by the tag generating unit 222 of the processing-content control unit 220 at STEP Sf7, then buried in the image data called as part of the file (STEP Sf8) and stored in the image storage unit 32 again.

When an output is produced by the second method above without burying such a tag, on the other hand, the processing contents of the image is actually executed by the image-processing execution unit 250 with respect to the image data called at STEP Sf9 and stored in the image storage unit 32 again.

At STEP Sf10, a decision is made on whether the aggregate area is an object to be output like the decision made at STEP Sf2. When the object is an aggregate area, STEP Sf3 is followed in order to apply the same process to all the unprocessed images registered in the aggregate area, whereas when the object is not an aggregate area, STEP Sf1 is followed.

When the output designation is directed to the image in the case of an output like that, the process is applied over a course: STEP Sf1→2→5→6→9 (7, 8)→10.

When the output destination is directed to an aggregate area, the process is applied over a course: STEP Sf3→4→5→6→9 (7, 8)→10→3 and the order is repeated thereinafter, whereby the same process is applied to all the registered images. When the aggregate area is subordinated to a high-order aggregate area, on the other hand, the object is moved to the high-order aggregate area as the decided result at STEP Sf3 is "No" and the same process is applied to the high-order aggregate area.

The image data with the tag buried therein or what has actually undergone the image processing is supplied in the form of a file as the image data subjected to image processing according to this embodiment of the invention and provided for another image processing apparatus and an output unit.

According to this embodiment of the invention, the processing applied to an image can be applied to another image without defining the processing newly since an image and processing contents to be applied thereto can separately be held by an aggregate area. Thus the adjustment made in the past is applicable to an entirely different image likewise, so that the reusability and common usability of processing contents are made improvable. Moreover, processing contents are registered in each aggregate area so that the stratified structure of the aggregate area is capable of branching off, whereby processing contents are made classifiable.

Further, the use of the adjusting-quantity definition makes it possible to effect image processing without judging the contents of various parameters.

<4: Modification>

Figure 20:
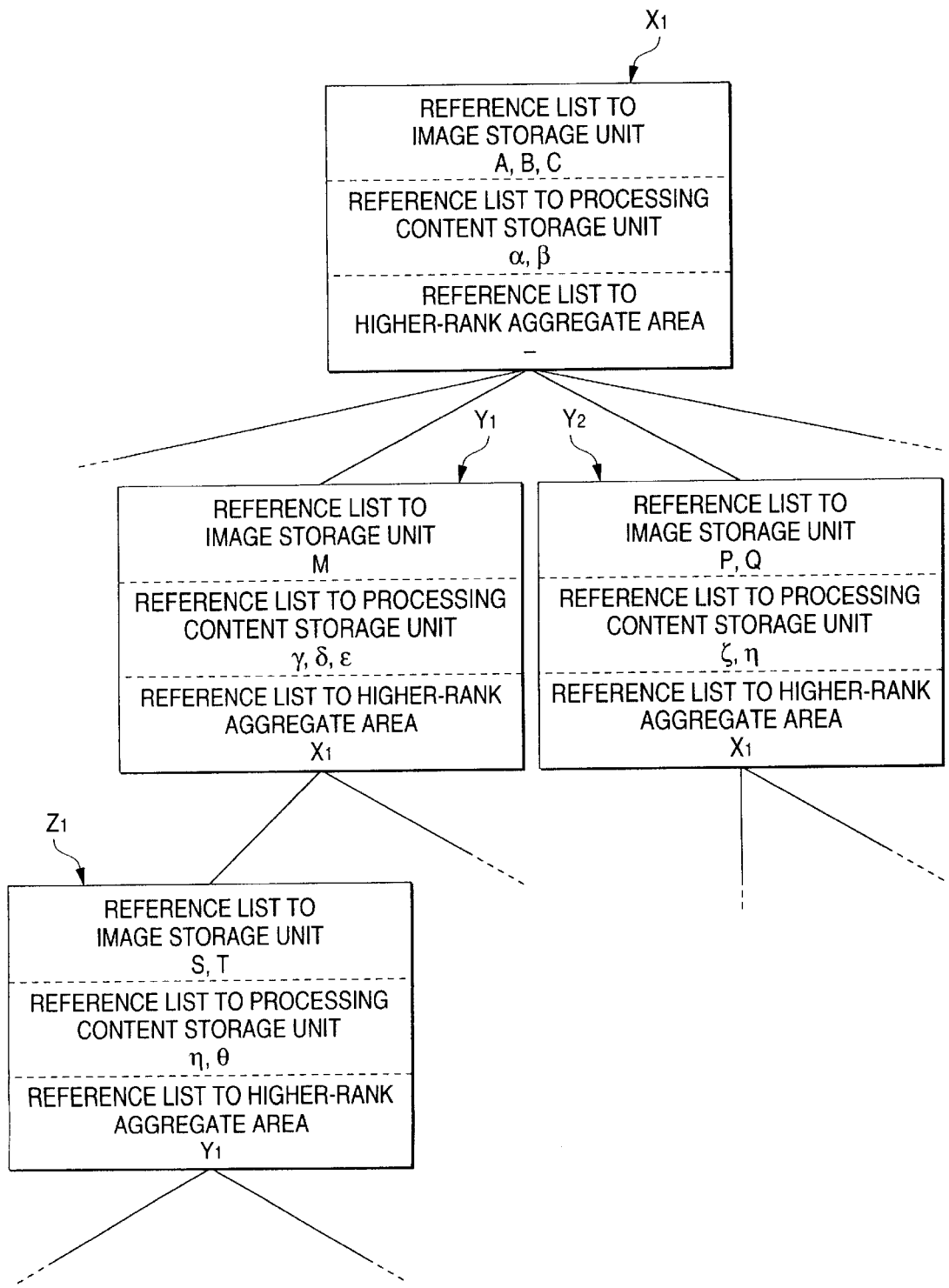
FIG. 20 is a diagram illustrating another exemplary arrangement of the aggregate area.

The aggregate area concept in the present application is not limited to what is shown in FIG. 8. As shown in FIG. 20, for example, the stratified structure may be built by listing data indicative of a high-order aggregate area to which the aggregate area concerned is to be subordinated in an additional "reference list to high-order aggregate area" without referring to another aggregate area in connection with the "reference list to processing-content storage unit."

Although data specifying another aggregate area is listed in the "reference list to processing-content storage unit" to refer to the aggregate area according to this embodiment of the invention, further, the "reference list to image storage unit" may be used for the purpose.

In these case, similar processing is performable through the operations according to the above embodiment of the invention by regarding the "reference list to high-order aggregate area" on the same basis as the "reference list to processing-content storage unit" or the "reference list to image storage unit."

As set forth above, according to the present invention, an image and its processing contents are held in a separated form and the processing contents intended for image elements having different image attributes can be designated or altered. Further, with the support of trial and error in image processing and processing contents in the past that can readily be arrange in order or classified as know-how, the degree of freedom and flexibility of image processing become expandable.

What is claimed is:

1. An image processing apparatus comprising:

input means for entering a plurality of input image data for image formation which include image elements having different image attributes;

aggregate area defining means for defining aggregate areas which indicate image processing contents to be applied to the input image data;

image data group forming means for forming an image data group by allocating the input image data to the aggregate areas;

determining means for determining a particular one of image processing contents to be applied to the input image data; and designating means for designating the particular image processing content with respect to the aggregate areas.

2. The image processing apparatus as claimed in claim 1, wherein the particular image processing content is an attribute to be adjusted of image data and an adjusting level of the attribute.

3. The image processing apparatus as claimed in claim 1, wherein the particular image processing content uses a device-independent, standard color space signal.

4. The image processing apparatus as claimed in claim 1, wherein the particular image processing content is a color adjustment.

5. The image processing apparatus as claimed in claim 4, wherein the particular image processing content is an attribute to be adjusted by the color adjustment and an adjusting level of the attribute.

6. The image processing apparatus as claimed in claim 1, further comprising:

storage means for storing the particular image processing content; and altering means for altering the particular image processing content stored in the storage means.

7. The image processing apparatus as claimed in claim 6, wherein the altering means alters a processing order of the particular image processing content.

8. The image processing apparatus as claimed in claim 1, further comprising:

converting means for converting the particular image processing content into tag data; and adding means for adding the tag data to image data.

9. The image processing apparatus as claimed in claim 1, further comprising processing means for applying the particular image processing content to the image data group allocated to the aggregate areas.

10. The image processing apparatus as claimed in claim 1, further comprising processing means for applying the particular image processing content to particular image data of the image data group allocated to the aggregate areas.

11. The image processing apparatus as claimed in claim 1, further comprising individual designation means for designating the particular image processing content with respect to the individual input image data.

12. An image processing apparatus comprising:

input means for entering a plurality of input image data for image formation which include image elements having different image attributes;

adjusting quantity defining means for defining, as an adjusting quantity, an image processing content to be applied to the input image data;

aggregate area defining means for defining aggregate areas to be used for designating image processing contents to be applied to image data, image data group forming means for forming an image data group by allocating the input image data to the aggregate areas;

attribute recognizing means for recognizing an attribute of the input image data and a level of the attribute;

designating means for designating the image processing content defined by the adjusting quantity defining means with respect to the aggregate areas; and adjusting means for adjusting the attribute level of image data allocated to an image-processing-content-designated aggregate area in accordance with the adjusting quantity.

13. The image processing apparatus as claimed in claim 12, wherein the adjusting quantity is an image processing content that is defined by an ambiguous expression.

14. The image processing apparatus as claimed in claim 13, wherein the ambiguous expression is a sensuous expression.

15. The image processing apparatus as claimed in claim 13, wherein the image processing content defined by the ambiguous expression represents a use at the time of image output.

16. The image processing apparatus as claimed in claim 13, wherein the image processing content defined by the ambiguous expression is an image content of image data.

17. The image processing apparatus as claimed in claim 12, further comprising converting means for converting the adjusting quantity into an attribute of image data and an adjusting level of the attribute, wherein the adjusting means adjusts the attribute level of the image data in accordance with the attribute and the adjusting level of the attribute obtained by the converting means.

18. The image processing apparatus as claimed in claim 12, further comprising individual designation means for designating the image processing content defined by the adjusting quantity defining means with respect to the individual input image data, wherein the adjusting means adjusts the attribute level of the image data in accordance with the image processing content designated by the individual designation means.

19. An image attribute adjusting method for adjusting an attribute of input image data in accordance with an instruction from a user, comprising the steps of:

defining an image processing content to be applied to given image data as an adjusting quantity, setting aggregate areas to be used for designating the adjusting quantity to be applied to image data;

allocating particular image data to one of the aggregate areas thus set in accordance with an instruction from the user;

designating the adjusting quantity with respect to the aggregate area to which the particular image data has been allocated; and processing the particular image data in the aggregate area in accordance with the adjusting quantity.

20. The image attribute adjusting method as claimed in claim 19, wherein the aggregate area can be subordinated to another aggregate area.

21. The image attribute adjusting method as claimed in claim 19, wherein the adjusting quantity is an image processing content defined by an ambiguous expression.

22. The image attribute adjusting method as claimed in claim 21, wherein the ambiguous expression is a sensuous expression.

23. The image attribute adjusting method as claimed in claim 21, wherein the image processing content defined by the ambiguous expression represents a use at the time of image output.

24. The image attribute adjusting method as claimed in claim 21, wherein the image processing content defined by the ambiguous expression is an image content of image data.

25. The image attribute adjusting method as claimed in claim 19, further comprising the steps of:

recognizing an attribute of the input image data and an adjusting level of the attribute; and converting the adjusting level into an attribute of image data and an adjusting level of the attribute, wherein the processing step adjusts the recognized attribute level of the image data in accordance with the attribute and the adjusting level of the attribute obtained by the converting step.

* * * * *